(12) United States Patent
Almukaynizi et al.

(10) Patent No.: US 12,170,684 B2
(45) Date of Patent: Dec. 17, 2024

(54) SYSTEMS AND METHODS FOR PREDICTING THE LIKELIHOOD OF CYBER-THREATS LEVERAGING INTELLIGENCE ASSOCIATED WITH HACKER COMMUNITIES

(71) Applicants: Mohammed Almukaynizi, Tempe, AZ (US); Ericsson Marin, Tempe, AZ (US); Paulo Shakarian, Tempe, AZ (US); Gerardo Simari, Bahia Blanca (AR); Eric Nunes, Tempe, AZ (US)

(72) Inventors: Mohammed Almukaynizi, Tempe, AZ (US); Ericsson Marin, Tempe, AZ (US); Paulo Shakarian, Tempe, AZ (US); Gerardo Simari, Bahia Blanca (AR); Eric Nunes, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 341 days.

(21) Appl. No.: 16/522,001

(22) Filed: Jul. 25, 2019

(65) Prior Publication Data

US 2020/0036743 A1    Jan. 30, 2020

Related U.S. Application Data

(60) Provisional application No. 62/703,110, filed on Jul. 25, 2018.

(51) Int. Cl.
*H04L 9/40*       (2022.01)
*G06N 5/025*      (2023.01)

(52) U.S. Cl.
CPC ......... *H04L 63/1433* (2013.01); *G06N 5/025* (2013.01); *H04L 63/302* (2013.01)

(58) Field of Classification Search
CPC .............. H04L 63/1433; H04L 63/302; H04L 63/1425; G06N 5/025; G06N 3/0445; G06N 5/048
See application file for complete search history.

(56) References Cited

U.S. PATENT DOCUMENTS

| | | | |
|---|---|---|---|
| 8,020,210 B2 | 9/2011 | Tippett et al. | |
| 8,544,098 B2 | 9/2013 | Gustave et al. | |
| 8,955,127 B1 | 2/2015 | Sokolov et al. | |

(Continued)

FOREIGN PATENT DOCUMENTS

| | | |
|---|---|---|
| GB | 2583892 A | 5/2019 |
| WO | 2014152469 A1 | 4/2014 |

(Continued)

OTHER PUBLICATIONS

Benjamin, Victor; Li, Weifeng; Holt, Thomas; Chen, Hsinchun; "Exploring threats and vulnerabilities in hacker web: Forums, IRC and carding shops," 2015 IEEE International Conference on Intelligence and Security Informatics (ISI), Baltimore, MD, USA, 2015, pp. 85-90.*

(Continued)

*Primary Examiner* — Victor Lesniewski
(74) *Attorney, Agent, or Firm* — Polsinelli PC

(57) ABSTRACT

Various embodiments of a system and methods for reasoning about enterprise-related external cyber threats using a rule-leaning approach are disclosed.

8 Claims, 10 Drawing Sheets

(56) References Cited

U.S. PATENT DOCUMENTS

| | | |
|---|---|---|
| 8,966,639 B1 | 2/2015 | Roytman et al. |
| 9,292,885 B2 | 3/2016 | Astore |
| 9,294,498 B1* | 3/2016 | Yampolskiy .......... H04W 84/12 |
| 9,411,965 B2 | 8/2016 | Giakouminakis et al. |
| 9,692,778 B1 | 6/2017 | Mohanty |
| 9,928,369 B2 | 3/2018 | Grieco et al. |
| 10,078,750 B1 | 9/2018 | Oliver |
| 10,114,954 B1 | 10/2018 | Bellis et al. |
| 10,176,438 B2 | 1/2019 | Shakarian et al. |
| 10,217,071 B2 | 2/2019 | Mo et al. |
| 10,230,764 B2 | 3/2019 | Ng et al. |
| 10,313,385 B2 | 6/2019 | Shakarian et al. |
| 10,397,272 B1 | 8/2019 | Bruss et al. |
| 10,437,945 B2 | 10/2019 | Shakarian et al. |
| 10,754,959 B1 | 8/2020 | Rajasooriya et al. |
| 10,944,778 B1 | 3/2021 | Golan et al. |
| 11,062,022 B1 | 7/2021 | Kalamkar et al. |
| 11,126,679 B2 | 9/2021 | Shaabani et al. |
| 11,444,974 B1 | 9/2022 | Shakhzadyan et al. |
| 2005/0278786 A1 | 12/2005 | Tippett et al. |
| 2006/0156407 A1 | 7/2006 | Cummins |
| 2007/0250829 A1 | 10/2007 | Hillier et al. |
| 2010/0275263 A1 | 10/2010 | Bennett et al. |
| 2012/0210434 A1 | 8/2012 | Curtis et al. |
| 2013/0074188 A1 | 3/2013 | Giakouminakis et al. |
| 2013/0097706 A1 | 4/2013 | Titonis et al. |
| 2014/0137257 A1 | 5/2014 | Martinez et al. |
| 2014/0189873 A1 | 7/2014 | Elder et al. |
| 2014/0280610 A1 | 9/2014 | Chen et al. |
| 2014/0304343 A1 | 10/2014 | Skiba et al. |
| 2014/0337974 A1* | 11/2014 | Joshi .................. H04L 63/1425 726/23 |
| 2015/0163242 A1* | 6/2015 | Laidlaw ................ G06F 21/552 726/22 |
| 2015/0295948 A1 | 10/2015 | Hassell et al. |
| 2015/0332054 A1* | 11/2015 | Eck ..................... H04L 63/1416 726/25 |
| 2015/0381649 A1* | 12/2015 | Schultz ............... H04L 63/1433 726/25 |
| 2016/0119364 A1 | 4/2016 | Zolli |
| 2016/0188396 A1 | 6/2016 | Sonalker et al. |
| 2016/0188876 A1 | 6/2016 | Harris et al. |
| 2016/0197953 A1 | 7/2016 | King-Wilson |
| 2016/0248800 A1* | 8/2016 | Ng .................... G06Q 10/0635 |
| 2016/0371490 A1 | 12/2016 | Shakarian et al. |
| 2016/0381075 A1 | 12/2016 | Goyal et al. |
| 2017/0026391 A1* | 1/2017 | Abu-Nimeh .......... G06F 21/552 |
| 2017/0032130 A1* | 2/2017 | Joseph Durairaj ......................... H04L 63/1416 |
| 2017/0034023 A1 | 2/2017 | Nickolov et al. |
| 2017/0085595 A1* | 3/2017 | Ng ......................... G06Q 40/08 |
| 2017/0093904 A1* | 3/2017 | Ng .......................... H04L 63/20 |
| 2017/0208084 A1* | 7/2017 | Steelman ............ H04L 63/0209 |
| 2017/0214710 A1 | 7/2017 | Seiver et al. |
| 2017/0228537 A1* | 8/2017 | Casassa Mont .... G06F 21/6218 |
| 2017/0279843 A1 | 9/2017 | Schultz et al. |
| 2017/0288671 A1 | 10/2017 | Lewis et al. |
| 2017/0346846 A1 | 11/2017 | Findlay |
| 2017/0366572 A1* | 12/2017 | King-Wilson ...... H04L 63/1433 |
| 2018/0063170 A1* | 3/2018 | Truvé .................. H04L 63/1425 |
| 2018/0077251 A1 | 3/2018 | Shalita |
| 2018/0103054 A1 | 4/2018 | Cran et al. |
| 2018/0144123 A1 | 5/2018 | Levin et al. |
| 2018/0146004 A1 | 5/2018 | Belfiore, Jr. et al. |
| 2018/0150635 A1 | 5/2018 | Melvin et al. |
| 2018/0165597 A1 | 6/2018 | Jordan et al. |
| 2018/0197089 A1 | 7/2018 | Krasser et al. |
| 2018/0198816 A1* | 7/2018 | Ahmed ............... H04L 63/1408 |
| 2018/0225372 A1 | 8/2018 | Lecue et al. |
| 2018/0268304 A1 | 9/2018 | Manadhata et al. |
| 2018/0270261 A1 | 9/2018 | Pande et al. |
| 2018/0288086 A1 | 10/2018 | Amiri et al. |
| 2018/0309747 A1 | 10/2018 | Sweet et al. |
| 2018/0375896 A1 | 12/2018 | Wang et al. |
| 2019/0020669 A1* | 1/2019 | Glatfelter ............ H04W 12/122 |
| 2019/0028490 A1 | 1/2019 | Chen et al. |
| 2019/0052665 A1 | 2/2019 | Mahieu et al. |
| 2019/0095530 A1 | 3/2019 | Booker et al. |
| 2019/0114417 A1 | 4/2019 | Subbarayan et al. |
| 2019/0124109 A1 | 4/2019 | Foster et al. |
| 2019/0132352 A1 | 5/2019 | Zhang et al. |
| 2019/0138731 A1 | 5/2019 | Tan et al. |
| 2019/0138733 A1 | 5/2019 | Ionescu et al. |
| 2019/0147167 A1 | 5/2019 | Kim et al. |
| 2019/0190931 A1 | 6/2019 | Levin et al. |
| 2019/0230129 A1* | 7/2019 | Digiambattista ... H04L 63/1441 |
| 2019/0294802 A1 | 9/2019 | Eacmen, III et al. |
| 2019/0318424 A1 | 10/2019 | McWilliams et al. |
| 2019/0347327 A1 | 11/2019 | Patil et al. |
| 2019/0347428 A1 | 11/2019 | Youssefi et al. |
| 2019/0349351 A1* | 11/2019 | Verma .................... H04L 63/30 |
| 2019/0349393 A1 | 11/2019 | Nunes et al. |
| 2019/0377871 A1 | 12/2019 | Park et al. |
| 2019/0379692 A1 | 12/2019 | Duran et al. |
| 2020/0036743 A1 | 1/2020 | Almukaynizi et al. |
| 2020/0053121 A1 | 2/2020 | Wilcox |
| 2020/0057857 A1 | 2/2020 | Roytman et al. |
| 2020/0067953 A1* | 2/2020 | Mathew .............. H04L 63/0227 |
| 2020/0074078 A1 | 3/2020 | Saxe et al. |
| 2020/0082094 A1 | 3/2020 | McAllister et al. |
| 2020/0097662 A1 | 3/2020 | Hufsmith et al. |
| 2020/0106792 A1* | 4/2020 | Louie .................. H04L 63/1483 |
| 2020/0169483 A1 | 5/2020 | Kursun |
| 2020/0210590 A1* | 7/2020 | Doyle ......................... G06F 8/77 |
| 2020/0233961 A1 | 7/2020 | Wolfin et al. |
| 2020/0285752 A1 | 9/2020 | Wyatt et al. |
| 2020/0356675 A1 | 11/2020 | Shakarian et al. |
| 2020/0364349 A1 | 11/2020 | Nunes et al. |
| 2020/0410028 A1 | 12/2020 | Shaabani et al. |
| 2021/0019762 A1 | 1/2021 | Bosnjakovic et al. |
| 2021/0126949 A1 | 4/2021 | Nadgowda |
| 2021/0158176 A1 | 5/2021 | Wan et al. |
| 2021/0173935 A1 | 6/2021 | Ramasamy et al. |
| 2021/0185066 A1 | 6/2021 | Shah et al. |
| 2021/0209512 A1 | 7/2021 | Gaddam et al. |
| 2021/0234892 A1 | 7/2021 | Narayanaswamy |
| 2021/0310237 A1 | 10/2021 | Marlow et al. |
| 2021/0367966 A1 | 11/2021 | Yanay et al. |
| 2021/0382944 A1 | 12/2021 | Li et al. |
| 2022/0121741 A1 | 4/2022 | Araujo et al. |
| 2022/0129540 A1 | 4/2022 | Sheriff et al. |
| 2024/0176890 A1* | 5/2024 | Nunes .................... G06F 21/577 |

FOREIGN PATENT DOCUMENTS

| | | |
|---|---|---|
| WO | 2015200046 A1 | 12/2015 |
| WO | 2017078986 A1 | 5/2017 |
| WO | 2017137804 A1 | 8/2017 |
| WO | 2019089389 A1 | 5/2019 |
| WO | 2019157335 A1 | 8/2019 |

OTHER PUBLICATIONS

Nunes, Eric; Shakarian, Paulo; Simari, Gerardo; "At-risk system identification via analysis of discussions on the darkweb," 2018 APWG Symposium on Electronic Crime Research (eCrime), San Diego, CA, USA, 2018, pp. 1-12.*

Grisham, John; Samtani, Sagar; Patton, Mark; Chen, Hsinchun; "Identifying mobile malware and key threat actors in online hacker forums for proactive cyber threat intelligence," 2017 IEEE International Conference on Intelligence and Security Informatics (ISI), Beijing, China, 2017, pp. 13-18.*

Deliu, Isuf; Leichter, Carl; Franke, Katrin; "Extracting cyber threat intelligence from hacker forums: Support vector machines versus convolutional neural networks," 2017 IEEE International Conference on Big Data (Big Data), Boston, MA, USA, 2017, pp. 3648-3656.*

Almukaynizi, et al., "Darkmention: A deployed system to predict enterprise-targeted external cyberattacks," in 2018 IEEE International Conference on Intelligence and Security Informatics (ISI). IEEE, 2018, pp. 31-36.

(56) References Cited

OTHER PUBLICATIONS

Almukaynizi, et al., 2017. Proactive identification of exploits in the wild through vulnerability mentions online. In 2017 International Conference on Cyber Conflict (CyCon U.S.). 82-88. DOI : : https://doi.org/10.1109/CYCONUS.2017.8167501.

Almukaynizi, et al., Patch Before Exploited: An Approach to Identify Targeted Software Vulnerabilities, in AI in Cybersecurity (Springer, 2019), pp. 81-113.

Almukaynizi, et al., Predicting Cyber Threats through Hacker Social Networks in Darkweb and Deepweb Forums, in Proceedings of the 2017 International Conference of The Computational Social Science Society of the Americas (ACM, 2017), p. 12.

Brown, et al., 2014. Addressing scalability and robustness in security games with multiple boundedly rational adversaries. In International Conference on Decision and Game Theory for Security. Springer, 23-42.

Bullough, et al., in Proceedings of the 2017 ACM International Workshop on Security and Privacy Analytics (ACM, 2017).

Chung, et al., IEEE transactions on dependable and secure computing 10(4), 198 (2013).

CYR3CON. [Online] Available: https://www.cyr3con.ai, Last Accessed: Apr. 2019.

Darpa, "Explainable artificial intelligence (xai)." [Online] Available: https://www.darpa.mil/program/explainable-artificial-intelligence, Last Accessed: Apr. 2019.

Deb, et al., "Predicting cyber-events by leveraging hacker sentiment," Information, vol. 9, No. 11, p. 280, 2018.

Dingledine, et al., 2004. Tor: The Second-generation Onion Router. In Proceedings of the 13th Conference on USENIX Security Symposium—vol. 13 (SSYM'04). 21-21.

Fournier-Viger, et al., Lecture Notes in Artificial Intelligence, Subseries of Lecture Notes in Computer Science, in Advances in Artificial Intelligence (Springer Berlin Heidelberg, Berlin, Heidelberg, 2012), pp. 299-304.

García, et al., Theory and Practice of Logic Programming 4(2), 95 (2004).

Garcia-Teodoro, et al., 2009. Anomaly-based network intrusion detection: Techniques, systems and challenges. Computers & security 28, 1-2 (2009), 18-28.

Ghosh, et al., 2017. Automated Categorization of Onion Sites for Analyzing the Darkweb Ecosystem. In Proceedings of the 23rd ACM SIGKDD International Conference on Knowledge Discovery and Data Mining. ACM, 1793-1802.

Google, "Cloud translation API documentation." [Online] Available: https://cloud.google.com/translate/docs, Last Accessed: Apr. 2019.

Gov.uk, "2019 cyber security breaches survey." 2019. [Online]. Available: https://www.gov.uk/government/statistics/cyber-security-breaches-survey-2019.

Goyal, et al., "Discovering signals from web sources to predict cyber attacks," arXiv preprint arXiv:1806.03342, 2018.

Guidotti, et al., "A survey of methods for explaining black box models," ACM Computing Surveys (CSUR), vol. 51, No. 5, p. 93, 2018.

Han, et al., "Mining frequent patterns without candidate generation," in ACM sigmod record, vol. 29, No. 2. ACM, 2000, pp. 1-12.

IdentityForce Data breaches—the worst breaches, so far. [Online]. Available: https://www.identityforce.com/blog/2017-data-breaches (Last Accessed: Jun. 2019).

IdentityForce Data breaches—the worst breaches, so far. [Online]. Available: https://www.identityforce.com/blog/2019-data-breaches (Last Accessed: Jun. 2019).

Kleinberg, et al., 2012. The Temporal Logic of Causal Structures. CoRR abs/1205.2634 (2012). [Online] Available: arXiv:1205.2634 http://arxiv.org/abs/1205. 2634.

Kwon, et al., 2017. Crisis and collective problem solving in dark web: An exploration of a black hat forum. In 8th International International Conference on Social Media and Society,# SMSociety 2017. Association for Computing Machinery.

Lee, et al. "Computing LP MLN using ASP and MLN solvers*," Theory and Practice of Logic Programming, vol. 17, No. 5-6, pp. 942-960, 2017.

Liao, et al., 2013. Intrusion detection system: A comprehensive review. Journal of Network and Computer Applications 36, 1 (2013), 16-24.

Mannes, et al., 2008. Stochastic opponent modeling agents: A case study with Hezbollah. In Social Computing, Behavioral Modeling, and Prediction. Springer, 37-45.

Marin, et al., in 2018 IEEE Intl Conf on Parallel Distributed Processing with Applications, Ubiquitous Computing Communications, Big Data Cloud Computing, Social Computing Networking, Sustainable Computing Communications (ISPA/IUCC/BDCloud/SocialCom/SustainCom) (2018), pp. 1183-1190.

Mitchell, et al., 2015. Behavior Rule Specification-Based Intrusion Detection for Safety Critical Medical Cyber Physical Systems. IEEE Transactions on Dependable and Secure Computing 12, 1 (Jan. 2015), 16-30. DOI : https://doi.org/10.1109/TDSC.2014. 2312327 .

Montgomery, et al., 2012. Improving predictions using ensemble Bayesian model averaging. Political Analysis 20, 3 (2012), 271-291.

Motoyama, et al., 2011. An analysis of underground forums. In Proceedings of the 2011 ACM SIGCOMM conference on Internet measurement conference. ACM, 71-80.

Munkres, "Algorithms for the assignment and transportation problems," Journal of the society for industrial and applied mathematics, vol. 5, No. 1, pp. 32-38, 1957.

Nespoli, et al., Optimal Countermeasures Selection Against Cyber Attacks: A Comprehensive Survey on Reaction Frameworks, in IEEE Communications Surveys & Tutorials (2017).

NIST. National vulnerability database. https://nvd.nist.gov/ (Last Accessed: Jun. 2019).

Nunes, et al., "Argumentation models for cyber attribution," in Proceedings of the 2016 IEEE/ACM International Conference on Advances in Social Networks Analysis and Mining. IEEE Press, 2016, pp. 837-844.

Nunes, et al., "At-risk system identification via analysis of discussions on the darkweb," in APWG Symposium on Electronic Crime Research (eCrime), 2018. IEEE, 2018, pp. 1-12.

Nunes, et al., 2016. Darknet and Deepnet Mining for Proactive Cybersecurity Threat Intelligence. In Proceeding of ISI 2016. IEEE, 7-12.

Ribeiro, et al., "Why should I trust you? Explaining the predictions of any classifier," in Proceedings of the 22nd ACM SIGKDD international conference on knowledge discovery and data mining. ACM, 2016, pp. 1135-1144.

Robertson, et al., 2016. Data Driven Game Theoretic Cyber Threat Mitigation.

Roy, et al., in IEEE/IFIP International Conference on Dependable Systems and Networks (DSN 2012) (IEEE, 2012), pp. 1-12.

U.S. Appl. No. 16/548,329, Tavabi et al., filed Aug. 22, 2019.
U.S. Appl. No. 16/640,878, Shakarian et al., filed Feb. 21, 2020.
U.S. Appl. No. 16/653,899, Sarkar et al., filed Oct. 15, 2019.
U.S. Appl. No. 16/875,540, Nunes et al., filed May 15, 2020.

Sabottke, et al., "Vulnerability disclosure in the age of social media: exploiting twitter for predicting real-world exploits," in 24th {USENIX} Security Symposium ({USENIX} Security 15), 2015, pp. 1041-1056.

Sapienza, "Discover: Mining online chatter for emerging cyber threats," in Companion of the The Web Conference 2018 on The Web Conference 2018. International World Wide Web Conferences Steering Committee, 2018, pp. 983-990.

Sapienza, et al., 2017. Early Warnings of Cyber Threats in Online Discussions. In 2017 IEEE International Conference on Data Mining Workshops (ICDMW). IEEE, 667-674.

Sarkar, et al., Predicting enterprise cyber incidents using social networks analysis on the darkweb hacker forums. CoRR abs/1811. 06537 (2018). URL http://arxiv.org/abs/1811.06537 .

Shakarian, et al., 2011. Annotated Probabilistic Temporal Logic. ACM Trans. Comput. Logic 12, 2, Article 14 (Jan. 2011), 44 pages.

Shakarian, et al., 2012. Annotated Probabilistic Temporal Logic: Approximate Fixpoint Implementation. ACM Trans. Comput. Logic 13, 2, Article 13 (Apr. 2012), 33 pages.

(56) References Cited

OTHER PUBLICATIONS

Shakarian, et al., 2016. Exploring malicious hacker forums. In Cyber Deception. Springer, 259-282.
Soska, et al., in USENIX Security Symposium (2014), pp. 625-640.
Stanton, et al., 2015. Mining for Causal Relationships: A Data-Driven Study of the Islamic State. In Proceedings of the 21th ACM SIGKDD International Conference on Knowledge Discovery and Data Mining (KDD '15). ACM, New York, NY, USA, 2137-2146.
Sun, et al., IEEE Communications Surveys & Tutorials 21(2), 1744 (2018).
Symantec, "2019 internet security threat report," [Online] Available: https://resource.elq.symantec.com/e/f2, Last Accessed: Apr. 2019.
Tavabi, et al., 2018. DarkEmbed: Exploit Prediction with Neural Language Models. In Proceedings of AAAI Conference on Innovative Applications of AI (IAAI2018).
TextRazor, "Textrazor api." [Online] Available: https://www.textrazor.com/, Last Accessed: Apr. 2019.
Verizon, "2017 data breach investigations report," 2017. [Online]. Available: https://www.ictsecuritymagazine.com/wp-content/uploads/2017-Data-Breach-Investigations-Report.pdf.
Widmer, et al., Learning in the Presence of Concept Drift and Hidden contexts. Machine learning 23(1), 69 (1996).
Kotenko, et al., Analyzing vulnerabilities and measuring security level at design and exploitation stages of computer network life cycle, International Workshop on Mathematical Methods, Models, and Architectures for Computer Network Security. Springer, Berlin, Heidelberg, 2005.
Lakhina, et al., Diagnosing network-wide traffic anomalies, ACM SIGCOMM Computer Communication Review, vol. 34, No. 4, pp. 219-230. ACM, 2004.
L'huillier, et al., Topic-based social network analysis for virtual communities of interests in the dark web, ACM SIGKDD Explorations Newsletter 12, No. 2: 66-73, 2011.
Liu, et al., Predicting cyber security incidents using feature-based characterization of network-level malicious activities, Proceedings of the 2015 ACM International Workshop on International Workshop on Security and Privacy Analytics. ACM, 2015.
Meier, The group lasso for logistic regression, Journal of the Royal Statistical Society: Series B (Statistical Methodology) 70.1: 53-71, 2008.
Trieu, et al., News classification from social media using twitter-based doc2vec model and automatic query expansion. In Proceedings of the Eighth International Symposium on Information and Communication Technology, pp. 460-467. ACM, 2017.
Nagaraja, et al., Anonymity in the wild: Mixes on unstructured networks, International Workshop on Privacy Enhancing Technologies, pp. 254-271. Springer, Berlin, Heidelberg, 2007.
Nagaraja, et al., BotGrep: Finding P2P Bots with Structured Graph Analysis, USENIX Security Symposium, vol. 10, pp. 95-110, 2010.
Okutan, et al., Forecasting cyber at-tacks with imbalanced data sets and different time granularities, arXiv preprint arXiv:1803.09560, 2018.
Randall, Rapidly mixing Markov chains with applications in computer science and physics, Computing in Science and Engineering 8.2: 30-41, 2006.
Reksna, Complex Network Analysis of Darknet Black Market Forum Structure. MS thesis. 2017.
Shlens, A tutorial on principal component analysis, arXiv preprint arXiv:1404.1100 2014.
Sood, et al., Cybercrime: Dissecting the state of underground enterprise, IEEE internet computing 17.1 (2013): 60-68.
Soule, et al., Combining filtering and statistical methods for anomaly detection, Proceedings of the 5th ACM SIGCOMM conference on Internet Measurement. USENIX Association, 2005.
Tang, et al., Temporal distance metrics for social network analysis, Proceedings of the 2nd ACM workshop on Online social networks, pp. 31-36. ACM, 2009.

Thonnard, et al. Are you at risk? Profiling organizations and individuals subject to targeted attacks, International Conference on Financial Cryptography and Data Security. Springer, Berlin, Heidelberg, 2015.
Tibshirani, et al., An ordered lasso and sparse time-lagged regression, Technometrics 58, No. 4 (2016): 415-423.
Veeramachaneni, et al., AI2W: training a big data machine to defend, 2016 IEEE 2nd International Con-ference on Big Data Security on Cloud (BigDataSecurity), IEEE International Conference on High Performance and Smart Computing (HPSC), and IEEE International Conference on Intelligent Data and Security (IDS), pp. 49-54. IEEE, 2016.
Xu, et al., Longitudinal lasso: Jointly learning features and temporal contingency for outcome prediction, Proceedings of the 21th ACM SIGKDD International Conference on Knowledge Discovery and Data Mining. ACM, 2015.
Xu, et al., The topology of dark networks, Communications of the ACM 51.10: 58-65, 2008.
Yang, et al., A comparative analysis of community detection algorithms on artificial networks, Scientific reports 6: 30750, 2016.
Yip, et al., Why forums?: an empirical analysis into the facilitating factors of carding forums, Proceedings of the 5th Annual ACM Web Science Conference. ACM, 2013.
Zhang, Daoqiang, et al., Temporally-constrained group sparse learning for longitudinal data analysis, International Conference on Medical Image Computing and Computer-Assisted Intervention. Springer, Berlin, Heidelberg, 2012.
Shakarian et al., Chaper 8 Cyber Attribution: An Argumentation-Based Approach, pp. 151-171, 2015.
Walden, et al., Predicting vulnerable components: Software metrics vs text mining. In Software Reliability Engineering (ISSRE), 2014 IEEE 25th International Symposium on, pp. 23-33. IEEE, 2014.
Samtani et al., Exploring Emerging Hacker Assets and Key Hackers for Proactive Cyber Threat Intelligence, Journal of Management Information Systems, 34:4, pp. 1023-1053, published online: Jan. 2, 2018.
Robertson, et al., 2017, Darkweb Cyber Threat Intelligence Mining, Cambridge University Press, pp. 38-55.
Abbasi, et al., Descriptive analytics: Examining expert hackers in web forums. In Intelligence and Security Informatics Conference (JISIC), 2014 IEEE Joint, pp. 56-63. IEEE, 2014.
CPE. Official common platform enumeration dictionary. 2017. https://nvd.nist.gov/cpe.cfm, Last Accessed: Feb. 2018.
CVE. Common vulnerabilities and exposures: The standard for information security vulnerability names. 2016. http://cve.mitre.org/, Last Accessed: Feb. 2018.
CVSS. Common vulnerability scoring system. https://www.first.org/cvss, Last Accessed: Feb. 2018.
Dung, On the acceptability of arguments and its fundamental role in nonmonotonic reasoning, logic programming and n-person games. Artificial intelligence, 77(2):321-357, 1995.
Ghaffarian, et al., Software vulnerability analysis and discovery using machine-learning and data-mining techniques: A survey. ACM Computing Surveys (CSUR), 50(4):56, 2017.
Lee, et al., Engineering doc2vec for automatic classification of product descriptions on o20 applications. Electronic Commerce Research, pp. 1-24, 2017.
Macdonald, et al., Identifying digital threats in a hacker web forum. In Advances in Social Networks Analysis and Mining (ASONAM), 2015 IEEE/ACM International Conference on, pp. 926-933. IEEE, 2015.
Marin, et al., Mining key-hackers on darkweb forums. In International Conference on Data Intelligence and Security (ICDIS), 2018. IEEE, 2018.
Neuhaus, et al., Predicting vulnerable software components. In Proceedings of the 14th ACM conference on Computer and communications security, pp. 529-540. ACM, 2007.
Chawla, et al., SMOTE: Synthetic Minority Over-sampling Technique. J. Artif. Int. Res. 16, (Jun. 1, 2002), 321-357. http://dl.acm.org/citation.cfm?id=1622407.1622416.
Cisco 2016 Midyear Security Report. Last Accessed: May 2017. http://www.cisco.com/c/dam/m/en_ca/never-better/assets/files/midyear-security-report-2016.pdf.

(56) References Cited

OTHER PUBLICATIONS

CiscoTalos. Last Accessed: May 2017. https://www.talosintelligence.com/vulnerability_reports.
Contagio. Last Accessed: May 2017. http://contagiodump.blogspot.com/.
Khandpur, et al., Crowdsourcing cybersecurity: Cyber attack detection using social media, Proceedings of the 2017 ACM on Conference on Information and Knowledge Management. ACM, 2017.
Durumeric, et al., 2014. The matter of heartbleed. In Proceedings of the 2014 Conference on Internet Measurement Conference. ACM, 475-488.
Exploit Database by offensive security. Last Accessed: May 2017. https://www.exploit-db.com/.
Frei, et al., 2010. Modeling the security ecosystem-the dynamics of (in) security. In Economics of Information Security and Privacy. Springer, 79-106.
Galar, et al., 2012. A Review on Ensembles for the Class Imbalance Problem: Bagging-, Boosting-, and Hybrid-Based Approaches. IEEE Transactions on Systems, Man, and Cybernetics, Part C (Applications and Reviews) 42, (Jul. 4, 2012), 463-484. https://doi.org/10.1109/TSMCC.2011.2161285.
Guo, et al., Mutual information and minimum mean-square error in Gaussian channels. IEEE Transactions on Information Theory 51, 4 (2005), 1261-1282.
Holt, et al., Examining the social networks of malware writers and hackers. International Journal of Cyber Criminology 6, 1 (2012), 891.
Holt, et al., Exploring stolen data markets online: products and market forces. Criminal Justice Studies 23, 1 (2010), 33-50. https://doi.org/10.1080/14786011003634415 arXiv:http://dx.doi.org/10.1080/14786011003634415.
Iarpa. Last Accessed: May 2017. Cyber-attack Automated Unconventional Sensor Environment (Cause). https://www.iarpa.gov/index.php/research-programs/cause. (Last Accessed: May 2017).
Larson. CNN Business, Researchers find possible North Korea link to massive cyberattack. Last Accessed: May 2017. http://money.cnn.com/2017/05/15/technology/wannacry-hack-responsible-hackers/.
Mell, et al., A Complete Guide to the Common Vulnerability Scoring System. Last Accessed: May 2007. https://www.first.org/cvss/v2/guide.
Metasploit. Last Accessed: May 2017. https://www.metasploit.com/.
Mitre. Last Accessed: May 2017. CVE Numbering Authorities. https://cve.mitre.org/cve/cna.html.
Nayak, et al., 2014. Some vulnerabilities are different than others. In International Workshop on Recent Advances in Intrusion Detection. Springer, 426-446.
Nouh, et al., 2015. Identifying Key-Players in Online Activist Groups on the Facebook Social Network. In Data Mining Workshop (ICDMW), 2015 IEEE International Conference on. IEEE, 969-978.
NVD, Products>CPE. Last Accessed: May 2017. Official Common Platform Enumeration Dictionary. https://nvd.nist.gov/cpe.cfm.
Page, et al., 1998. The PageRank citation ranking: Bringing order to the web. Technical Report. Stanford InfoLab.
Pedregosa, et al, Scikit-learn: Machine learning in Python. Journal of Machine Learning Research 12, (Oct. 2011), 2825-2830.
Phillips, et al., Extracting social structure from darkweb forums. 2015.
Samtani, et al., 2015. Exploring hacker assets in underground forums. In Intelligence and Security Informatics (ISI), 2015 IEEE International Conference on. IEEE, 31-36.
SecurityFocus. Last Accessed: May 2017. SecurityFocus. http://www.securityfocus.com.
Stringhini, et al., 2015. EvilCohort: Detecting Communities of Malicious Accounts on Online Services. In Usenix Security. 563-578.
Symantec anti-virus attack signatures. Last Accessed: May 2017. https://www.symantec.com/security_response/landing/azlisting.jsp.
TippingPoint. Last Accessed: May 2017. The Zero Day Initiative. http://www.zerodayinitiative.com/.
Verizon Risk Team. 2015. 2015 Data Breach Investigations Report. (2015).
Virustotal. Last Accessed: May 2017. Virustotal. https://www.virustotal.com/.
Wikipedia. Last Accessed: May 2017. WannaCry ransomware attack. https://en.wikipedia.org/wiki/WannaCry_ransomware_attack.
Yamaguchi, et al., 2014. Modeling and discovering vulnerabilities with code property graphs. In Security and Privacy (SP), 2014 IEEE Symposium on. IEEE, 590-604.
Zhang, et al., Doina Caragea, and Xinming Ou. 2011. An empirical study on US-ing the national vulnerability database to predict software vulnerabilities. In International Conference on Database and Expert Systems Applications. Springer, 217-231.
Akoglu, et al., Graph based anomaly detection and description: a survey. Data mining and knowledge discovery, 29(3), pp. 626-688. 2015.
Allodi, Economic factors of vulnerability trade and exploitation, Proceedings of the 2017 ACM SIGSAC Conference on Computer and Communications Security. ACM, 2017.
Allodi, et al., Then and now: On the maturity of the cybercrime markets the lesson that black-hat marketeers learned, IEEE Transactions on Emerging Topics in Computing 4.1 (2016): 35-46.
Al-Rowaily, et al., BiSALA bilingual sentiment analysis lexicon to analyze Dark Web forums for cyber security, Digital Investigation 14: 53-62, 2015.
Bilge, et al., RiskTeller: Predicting the Risk of Cyber Incidents, Proceedings of the 2017 ACM SIGSAC Conference on Computer and Communications Security. ACM, 2017.
Chandola, et al., Anomaly detection: A survey, ACM computing surveys (CSUR) 41.3: 15, 2009.
Chen, Sentiment and affect analysis of dark web forums: Measuring radicalization on the internet, Intelligence and Security Infomatics, ISI 2008, IEEE International Conference, 2008.
Chierichetti, et al., Rumour spreading and graph conductance, Proceedings of the twenty-first annual ACM-SIAM symposium on Discrete Algorithms, Society for Industrial and Applied Mathematics, 2010.
Colbaugh, et al., Proactive defense for evolving cyber threats, Intelligence and Security Informatics (ISI), 2011 IEEE International Conference on. IEEE, 2011.
Danezis, et al., Sybillnfer: Detecting Sybil Nodes using Social Networks, NDSS, pp. 1-15, 2009.
Ferrara, et al., The rise of social bots, Communications of the ACM, 59(7), pp. 96-104. 2016.
Grier, et al., Manufacturing compromise: the emergence of exploit-as-a-service, Proceedings of the 2012 ACM conference on Computer and communications security, pp. 821-832. ACM, 2012.
Haslebacher, et al., All your cards are belong to us: Understanding online carding forums, Electronic Crime Research (eCrime), 2017 APWG Symposium on. IEEE, 2017.
Herley, et al., Nobody sells gold for the price of silver: Dishonesty, uncertainty and the underground economy, Economics of information security and privacy. Springer, Boston, MA, 2010. 33-53. 2010.
Hodge, et al., A survey of outlier detection methodologies, Artificial intelligence review 22.2: 85-126, 2004.
Huang, et al., In-network PCA and anomaly detection, Advances in Neural Information Processing Systems, pp. 617-624. 2007.
Stolzenburg, et al., Computing generalized specificity. Journal of Applied Non-Classical Logics, 13(1):87-113, 2003.
Bommannavar et al., Security Risk Management in Computing Systems with Constraints on Service Disruption, 2011 Proceedings of 20th International Conference on Computer Communications and Networks (ICCCN), 2011, pp. 10-16, doi: 10.1109/ICCCN.2011.6005875.
Brady et al., Docker Container Security in Cloud Co1109/CCWC47524.2020.9031195.
Macdonald et al., Spreaders in the Network SIR Model: An Emperical Study, published on arxiv.org, 2012, available at https://arxiv.org/pdf/1208.4269.pdf.
Moores et al., Finding Near-Optimal Groups of Epidemic Spreaders in a Complex Network, PLoS One 9(4), 2014.

(56) References Cited

OTHER PUBLICATIONS

Roldan-Molina, A Decision Support System for Corporation Cyber Security Risk Management, 2017.
Saripalli et al., QUIRC: A Quantitative Impact and Risk Assessment Framework for Cloud Security, 2010 IEEE 3rd International Conference on Cloud Computing, IEEE, 2010.
Shakarian et al., Using Generalized Annotated Programs to Solve Social Network Diffusion Optimization Problems, ACM Transactions on Computational Logic, 14(2), 2013.
NIST. National vulnerability database. https://nvd.nist.gov/, Last accessed: Feb. 2018.
Rapid7, Exploit database, rapid7.com/db/, Oct. 2020.
Symantec, 2017a. Attack signatures—symantec corp., https://www.broadcom.com/support/security-center/attacksignatures.
Vulnerability database, N. 2013, Nvd. https://nvd.nist.gov/vuln/detail/CVE-2013-0285.
Adobe, 2012. Adding priority ratings to adobe security bulletins.
Allodi et al., 2014, Comparing vulnerability severity and exploits using case-control studies, ACM Trans. Inf. Syst. Secur. 17(1):1:1-1:20.
Bengio et al., 2003, A neural probabilistic language model, Journal of Machine Learning Research 3:1137-1155.
Bozorgi et al., 2010, Beyond heuristics: Learning to Classify Vulnerabilities and predict exploits, in KDD2010, 105-114.
Collobert et al., 2008, A unified architecture for natural language processing: Deep neural networks with multitask learning, in ICML, 160-167.
Cortes et al., 1995, Support-vector networks, Mach. Learn., 20(3): 273-297.
Edkrantz et al., 2015, Predicting cyber vulnerability exploits with machine learning, in SCAI, exploit database, 2009, Exploit database by offensive security.
Hao et al., 2016, Predator: Proactive recognition and elimination of domain abuse at time-of-registration, in CCS2016, 1568-1579.
Kostov et al., 2017, Cyberattack victims begin to assess financial damage, Wall Street Journal.
Le et al., 2014, Distributed representations of sentences and documents, in E.P. Xing and T. Jebara eds., ICML, vol. 32, 1188-1196.
Liu et al., 2015, Cloudy with a chance of breach: Forecasting cyber security incidents, in Usenix Security.
Marin et al., 2016, Product offerings in malicious hacker markets, in ISI, 187-189.
Martin et al., 2017, Effective cybersecurity is fundamental to patient safety.
Microsoft 2008, Exploitability index.
Mikolov et al., 2013a, Efficient estimation of word representations in vector space, arXiv preprint arXiv:1301.3781.
Mikolov et al., 2013b, Distributed representations of words and phrases and their compositionality, in NIPS, 3111-3119.
Mittal et al., 2016, Cybertwitter: Using twitter to generate alerts for cybersecurity threats and vulnerabilities, in ASONAM, 860-867.
Mnih et al., 2007, Three new graphical models for statistical language modeling, in ICML, 641-648.
Quinlan et al., 1986, Induction of decision trees, Mach. Learn. 1(1):81-106.
Quinn et al., 2010, SP 800-117, guide to adopting and using the security content automation protocol (SCAP) version 1.0, Technical Report, NIST, U.S. Dept of Commerce.
Rumelhart et al., 1988, Learning representations by back-propagating errors, Neurocomputing: Foundations of Research.
Samtani et al., 2016, Azsecure hacker assets portal: Cyber threat intelligence and malware analysis, in ISI, 19-24.
Scarfone et al., 2009, An analysis of cvss version 2 vulnerability scoring, in SESM, 516-525.
Scandariato, et al., Predicting vulnerable software components via text mining. IEEE Transactions on Software Engineering, 40(10):993-
Scandariato, et al., Predicting vulnerable software components via text mining. IEEE Transactions on Software Engineering, 40(10):993-1006, 2014.1006, 2014.
Portnoff, et al., Tools for automated analysis of cybercriminal markets. In Proceedings of the 26th International Conference on World Wide Web, pp. 657-666. International World Wide Web Conferences Steering Committee, 2017.
Allodi et al., 2012, A preliminary analysis of vulnerability scores for attacks in wild: the ekits and sym datasets, in Proceedings of the 2012 ACM Workshop on Building analysis datasets and gathering experience returns for security, ACM, 17-24.
Allodi et al., Quantitative assessment of risk reduction with cyber-crime black market monitoring, in Security and Privacy Workshops (SPW), 2013, IEEE, pp. 165-172.
Allodi et al., The Work-Averse Cyber Attacker Model, 2016.
Barreno et al., 2008, Open problems in the security of learning, in Proceedings of the 1st ACM workshop on Workshop on AISec. ACM, 19-26.
Barreno et al., The security of machine learning, Machine Learning 81, 2 (2010) 121-148.
Benjamin et al., Exploring threats and vulnerabilities in hacker web: Forums, IRC and carding shops, in Intelligence and Security Informatics (ISI), 2015 IEEE International Conference, IEEE, 85-90.
Beutel et al., 2015, Fraud detection through graph-based user behavior modeling, in Proceedings of the 22nd ACM SIGSAC Conference on Comptuer and Communications Security, ACM, 1696-1697.
Biggio et al., Support Vector Machines Under Adversarial Label Noise, ACML 20 (2011), 97-112.
Bilge et al., 2012, Before we knew it: an empirical study of zero-day attacks in the real world, in Proceedings of the 2012 ACM conference on computer and communications security ACM, 833-844.
Breiman, Bagging Preditors, Machine Learning 24, 2 (1996), 123-140.
Breiman, Random Forests, Machine Learning 45, 1 (2001), 5-32.
Bullough et al., 2017, Predicting exploitation of disclosed software vulnerabilities using open-source data, in Proceedings of the 2017 ACM International Workshop on Security and Privacy Analytics, ACM.
Cao et al., 2012, Aiding the detection of fake accounts in large scale social online services, in Proceedings of the 9th USENIX conference on Networked Systems and Design and Implementation USENIX Association, 15.
Cao et al., 2014, Uncovering large groups of active malicious accounts in online social networks, in Proceedings of the 2014 ACM SIGSAC Conference on Computer and Communications Security, ACM, 477-488.
Koo, Oliver, "Subset Sum algorithm", retrieved from: https://stackoverflow.com/questions/4355955/subset-sum-algorithm on Apr. 17, 2024, Aug. 1, 2017, 13 pages.

* cited by examiner

SYSTEMS AND METHODS FOR PREDICTING THE LIKELIHOOD OF CYBER-THREATS LEVERAGING INTELLIGENCE ASSOCIATED WITH HACKER COMMUNITIES

CROSS REFERENCE TO RELATED APPLICATIONS

This is a U.S. non-provisional patent application that claims benefit to U.S. provisional patent application Ser. No. 62/703,110 filed on Jul. 25, 2018 which is incorporated by reference in its entirety.

FIELD

The present disclosure generally relates to cyber threat prediction; and more particularly involves a rule-based approach for generating actionable warnings of cyber threats that support timely situational awareness operations, efficient resource allocations, and proactive countermeasure prioritizations.

BACKGROUND

With the widespread use of technology, cyber-security has become an important issue of concern for both commercial organizations and governments. With the recent incidents of data breaches at Equifax, Verizon, Gmail and others, organizations are looking at methods to proactively identify if they will be the target of future attacks. A 2017 Verizon investigation report stated that 75% of breaches were perpetrated by outsiders exploiting known vulnerabilities. Monitoring the activity of threat actors is a key aspect of predicting cyber-attacks.

Cyber threats also present major issues for cryptocurrency. Cryptocurrencies are digital currencies that primarily use the blockchain concept to record transactions. Perhaps the most well-known one is Bitcoin. In recent years, an increasing adoption of cryptocurrencies has been observed in a wide range of businesses as well as in the malicious actor community in the (D2web) forums. According to recent reports, the market capitalization of cryptocurrencies is estimated to exceed 400 billion dollars, after peaking at over 700 billion dollars. With the high reliance on technology, increasing adoption from businesses and traders, and due to the inherent anonymity associated with transactions and wallet owners, malicious threat actors (including hackers and scammers) aiming for financial gain have been highly motivated to hack and scam to gain control over cryptocurrency wallets and perform transactions.

The fast-evolving nature of cyberattacks, as well as the high direct and indirect cost of remediation, calls for organizations to seek proactive defense measures. Hackers may communicate prior to attacks using D2web hacking websites and it is generally desirable to formulate cyber threat predictions based on hacker communications. However, generating transparent and explainable predictions that allow human experts to understand the reasoning leading to such predictions is yet challenging.

Further, although cybersecurity research has demonstrated that many of the recent cyberattacks targeting real-world organizations could have been avoided, proactively identifying and systematically understanding when and why those events are likely to occur is challenging. Information associated with the D2web is constantly changing, and conventional methods of predicting cyber threats are too reliant upon specific data points associated with hacker communications.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
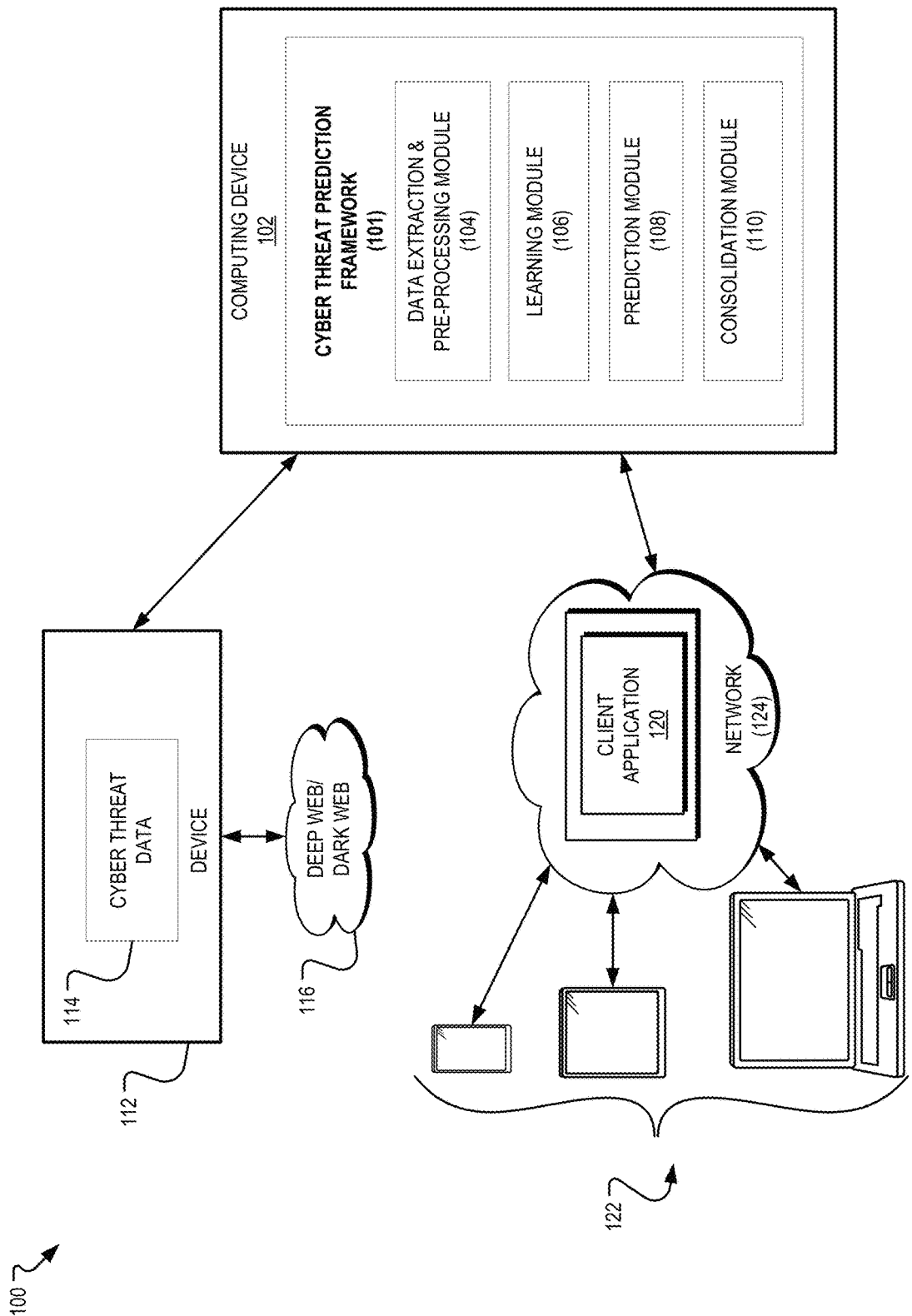
FIG. 1A is a simplified block diagram showing a computer-implemented system for rule-based cyber threat prediction.

Aspects of the present disclosure relate to a computer-implemented system and associated methods for predicting cyber threats using rule-based approaches. More specifically, at least a learning module and a prediction module may be executed by a computing device. The learning module may be configured, via machine learning or otherwise, to learn rules correlating indicators of cyber threats with real-world attack events, and the computing device may execute the prediction module to apply the rules from the learning module to real-world/additional data to generate warnings regarding possible impending cyber threats. In some embodiments, the learning module may include a logical programing framework defined as annotated probabilistic temporal logic (APT logic) that correlates hacker activity to real-world cyber events previously observed. The learning module may further incorporate other learning approaches, such as application of knowledge representation and reasoning (KRR).

Introduction:

To conduct a cyber-attack, malicious actors need to identify vulnerabilities, get resources to exploit those vulnerabilities, identify vulnerable targets and then successfully deploy their attacks. Darkweb (D2web) forums and marketplaces can provide an environment for analysis of anonymous discussions related to software vulnerabilities and purchase/sale of exploits available for the same. A cyber threat intelligence firm that collects and maintains threat intelligence recently reported intelligence on cyber-attacks before such attacks were actually carried out by malicious actors. Two such instances are shown in Table 1 below. For example, the Microsoft office vulnerability (CVE-2017-11882) was disclosed by the National Institute of Standards and Technology (NIST) on July 31st with no public knowledge of an available exploit. The interest in the vulnerability and exploit peaked in multiple D2web forums between 20-23rd of November as identified by the firm, three days before an actual attack was observed in the wild on November $26^{th}$.

TABLE 1

Attacks predicted

| Attack | Timeline (2017) |
| --- | --- |
| WannaCry Ransomware | Discussions on D2web: April 14. Attack observed: May 12. |
| Cobalt targeting Microsoft Office vulnerability CVE-2017-11882 | Disclosure by NIST: July 31. Hacker discussion on D2web: Nov 20-23. Attack Observed: Nov 26. |

Cyber Threat Related Terms:

A number of terms shall now be described which may be used to define cyber threat parameters and forms of cyber threat information. For example, the term CVE may be used to abbreviate the phrase, Common Vulnerability Exposure representing a potential vulnerability that a hacker or other bad actor may desire to exploit. A CVE may define a unique identifier assigned to a software vulnerability report from NIST which maintains a database of all the vulnerabilities publicly available in a National Vulnerability Database (NVD). The term CPE may be used to abbreviate the phrase, Common Platform Enumeration, and may relate to a list of specific software and hardware products that are vulnerable for a given CVE.

The "darkweb" or "deep web" (collectively "D2web") refers to the portion of the Internet not indexed by search engines and hence generally cannot be accessed by standard web browsers. Specialized browsers, such as Tor, are required to access these websites. Widely used for underground communication, "The Onion Router" (Tor) is free software dedicated to protect the privacy of its users by obscuring traffic analysis. The network traffic in Tor is guided through a number of volunteer-operated servers (also called "nodes"). Each node of the network encrypts the information it blindly passes on neither registering where the traffic came from nor where it is headed, thereby preventing any tracking of the traffic.

Hackers may utilize the D2web to form communities for identifying technology exploits and sharing information related to cyber threats. Hacker community discussions, general communications, or other such information may include Information retrieved from both marketplaces—where users advertise to sell information regarding vulnerabilities or exploits targeting the vulnerabilities and forums—where hackers or other bad actors engage in discussions on discovered vulnerabilities, among others.

EXEMPLARY EMBODIMENTS

Referring to FIG. 1A, a computer-implemented system 100 is shown which may be utilized for implementing various embodiments of a rule-based cyber threat prediction framework ("framework") 101 described herein. Embodiments of the framework 101 are referred to herein as Embodiment A, B, C and D. Each of the embodiments may generally be implemented using the components of system 100 described herein, yet each of the embodiments may include slightly different approaches for rule-learning and generating cyber threat warnings. For example, Embodiment A applies annotated probabilistic temporal logic to learn rules for predicting cyber threats, whereas Embodiment D utilizes knowledge representation and reasoning (KRR); i.e., KRR logic may be applied as described herein. It is contemplated that each features of each embodiment may be utilized by other embodiments, such that e.g., the features of Embodiment A may be utilized by other embodiments, and Embodiment A may incorporate features of other embodiments, etc.

Figure 9:
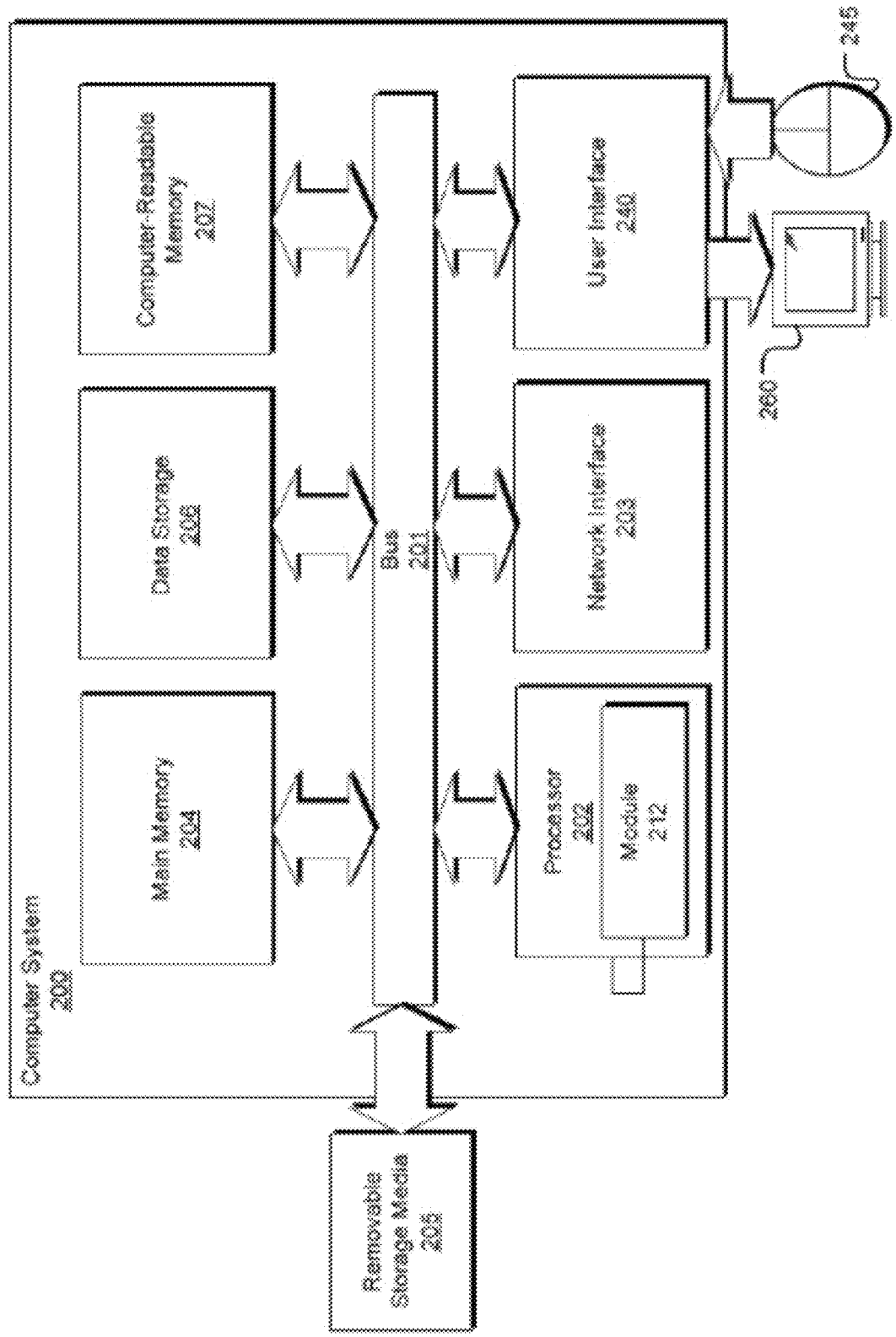
FIG. 9 is an example schematic diagram of a computing device that may implement various methodologies of the proposed framework.

As indicated, the framework 100 may include a plurality of components or modules executed or otherwise implemented using at least one computing device 102 (equipped with at least one or more of the features of the computing device 200 of FIG. 9). For example, the computing device 102 may be configured to execute or otherwise perform operations associated with a data extraction and pre-processing module 104, a learning module 106, a prediction module 108, and a consolidation module 110 defined by the framework 101. In some embodiments, one or more of the modules 104, 106, 108, and 110, may be implemented as code and/or machine-executable instructions executable by the computing device 102 that may represent one or more of a procedure, a function, a subprogram, a program, a routine, a subroutine, a module, a software package, a class, or any combination of instructions, data structures, or program statements, and the like. In other words, embodiments of the framework 101 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium, and a processor(s) associated with the computing device 102 may perform the tasks defined by the code.

As further shown, the system 100 may further include at least one device 112 in operable communication with the computing device 102. In some embodiments, the computing device 102 may access or be in operable communication with the device 112 to obtain cyber threat data 114 from the dark web or deep web 116 for rule-based learning as described herein. The device 210 may include any electronic device capable of accessing/tracking the cyber threat data 114 from the dark web or deep web 116. In addition, the system 100 may include a client application 120 which may be configured to provide aspects of the framework 101 to any number of client devices 122 via a network 124, such as the Internet, a local area network, a wide area network, a cloud environment, and the like.

Figure 1B:
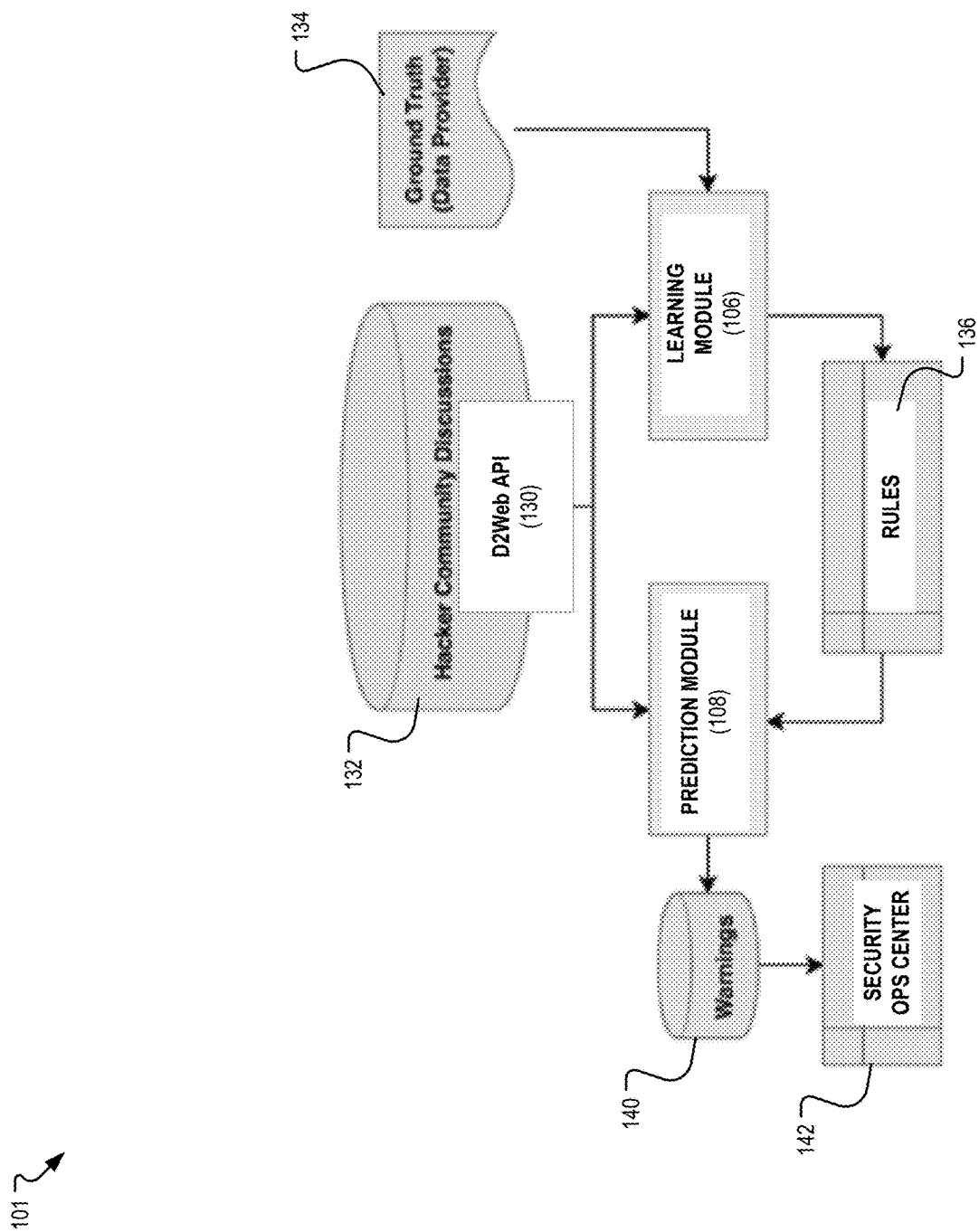
FIG. 1B is a simplified illustration of exemplary modules or components of a framework for implementing the rule-based cyber threat prediction.

Referring to FIG. 1B, additional detail regarding the flow of data and implementation of the framework 101 is illustrated. As shown, in some embodiments, an application programming interface (API) referred to herein as a D2Web API 130, may be executed by any computing device (e.g., computing device 102 as part of the data extraction and pre-processing module 104) to obtain a first dataset from hacker community discussions 132. Hacker community discussions 132 or hacker communications may be obtained from any number of forums, marketplaces or other platforms of the deep/dark web.

As further, shown, information from the hacker community discussions 132 may generally be applied to the learning module 106 along with ground truth data 134 to derive a plurality of rules 136, using one or more rule-based approaches (such as APT logic), by correlating indicators of cyber threats with real-world attack events. The indicators of threats may be annotated from a collection of communications of the hacker community discussions 132 while the real-world attack events may be annotated from a collection of cyberattack attempts observed by a Data Provider or other data source providing the ground truth data 134. In some embodiments, the framework 101 may use a single indicator-extracting approach. That is, indicators may include mapping mentions of software vulnerabilities (CVEs) to affected software vendors and product names (CPEs). These indicators may be annotated with dates as to when the corresponding vulnerabilities are mentioned, then used as preconditions in the rule-learning approach. It is contemplated that any number of threat-intelligence platforms may be leveraged for generating the rules 136, and that extracting indicators may involve capturing aggregate discussion trends. In another embodiment, the output of the learning module 106 may be an APT-logic program i.e., a set of APT rules.

Other embodiments of indicators are contemplated to accommodate the changing volume of cyber threat intelligence data. For example, many applications of event forecasting, the volume of signals from the monitored sensors is assumed to remain the same across the learning and the forecasting phases. However, this assurance does not exist with cyber threat intelligence data. A key driver to this is the ephemeral nature of many D2web sites. This ephemeral nature is due to a variety of reasons: law enforcement actions, malicious hackers going "dark", operational security measures employed by cyber criminals, and differences induced by the addition of newer data sources. Changes to the volume of incoming cyber threat intelligence data may directly impact the number of warnings, thus impacting the system's performance. Accordingly, the indicators that are evaluated may be based on volume of discussion trends exceeding a threshold computed from a sliding time window.

Once the rules 136 are generated, the framework 101 may then utilize the rules 136 to form real-world predictions regarding possible cyber threats/attacks based on additional or new communications extracted from the hacker community discussions 132. In other words, the prediction module 108 may use the output of the learning module 106, e.g., the APT-logic program, and the indicators annotated from the communications accessed from the hacker community discussions 132. The prediction module 108 may trigger one or more of the rules 136 if some indicators are observed matching preconditions of the rules 136 in the APT-logic program or otherwise. If a match is identified between an indicator (present within new communications extracted from the hacker community discussions 132) and a rule, the prediction module 108 may generate a warning with metadata including the corresponding indicators and hacking discussions. In other words, a second dataset may be accessed from the hacker community discussions 132 using the D2Web API 130 or otherwise, and the prediction module 108 may apply information from the second dataset to the rules 136 to generate warnings 140 with any number of predictions about the possible cyber threats/attacks. These warnings 140 may be transmitted to or otherwise made available to other devices/organizations, such as a security operations (OPS) center 142.

Further detail regarding the framework 101 and embodiments thereof shall now be described.

Functionality of Data Extraction and Pro-Processing Module (104) for Embodiments A and B In some embodiments, the data extraction and pre-processing module 104 may configure the computing device 102 to crawl the dark/deep web to collect the hacker community discussions 132. Data from the hacker community discussions 132 may be accessed using the D2Web API 130, or otherwise accessed and a database (not shown) may be formed comprising forum discussions and items offered for sale in marketplaces in the D2web. Light weight crawlers and parsers may be leveraged t constructed to collect hacker community discussions 132 data from forums and marketplaces. To accommodate collection of cyber-security relevant data, machine learning models may be employed to filter data of the hacker community discussions 132 related to drugs, weapons, and other discussions not relating to cyber-security.

The D2web API 103 may be configured to supply tags with each post using a tagging algorithm. Each tag may belong to one of three categories: financial, software, or general topic tags. The tagging algorithm may be used to post content. It may leverage known document similarity techniques to derive a vector representation of each post, compute its similarity with vector representations of a set of tags, and identify the tags that are most similar to that post based on the similarity score. The data extraction and pre-processing module 104 may use the count of tag mentions per day, i.e., when it exceeds certain threshold, it is viewed as a spiking activity. This threshold may be tag-dependent; meaning each tag has a threshold, determined based on the average and the standard deviation of its mentions per day in the historical data.

Ground Truth for Embodiments A and B (or Other Embodiments)

To construct rules and evaluate the performance of the learned model, real-world attack data may be provided by the IARPA CAUSE program. This real-world attack data, or historical known attack data, may function as the ground truth (GT) data 134 for the learning module 106 of Embodiments A and B or other embodiments. The GT data 134 may include time series data points of real-world attacks gathered from two participating hypothetical organizations. One of the two organizations may include a defense industrial base (referred to as Armstrong) while the other may define a financial services organization (referred to as Dexter). Each data point is a record of a detected deliberate malicious attempt to gain unauthorized access, alter or destroy data, or interrupt services or resources in the environment of the participating organization. Those malicious attempts may relate to real-world events detected in the wild, in uncontrolled environment, and by different security products such as anti-virus, intrusion detection systems, and hardware controls. Each GT data 134 record includes: ID, Format Version, Reported Time, Occurrence Time, Event Type, and Target Industry. The attack types that are included in the GT data 134 include:

Malicious Email. A malicious attempt is identified as a Malicious Email event if an email is received by the organization, and it either contains a malicious email attachment, or a link (embedded URL or IP address) to a known malicious destination.

Malicious Destination. A malicious attempt is identified as a visit to a Malicious Destination if the visited URL or IP address hosts malicious content.

Endpoint Malware. A Malware on Endpoint event is identified if malware is discovered on an endpoint device. This includes, but is not limited to, ransomware, spyware, and adware.

Table 2 summarizes the time periods and the number of records for each attack type for the participating organizations.

TABLE 2

| GT Provider | Attack Type | Sensor Dates | | | Total No. of Records |
| | | Start | End | Gaps | |
|---|---|---|---|---|---|
| Dexter | Malicious Email | Apr. 4, 2016 | Jul. 28, 2016 | N/A | 114 |
| | Endpoint Malware | Apr. 4, 2016 | Jul. 28, 2016 | N/A | 35 |
| | Malicious Destination | Mar. 15, 2016 | Apr. 4, 2016 | N/A | 88 |
| Armstrong | Malicious Email | Oct. 3, 2016 | Sep. 29, 2017 | N/A | 147 |
| | Endpoint Malware | Apr. 4, 2016 | Sep. 29, 2017 | Sep. 27, 2016 to Jun. 4, 2017 | 141 |
| | Malicious Destination | Apr. 4, 2016 | Sep. 29, 2017 | Aug. 22, 2016 to Jun. 4, 2017 | 32 |

Functionality of Data Extraction and Pre-Processing Module (104) for Embodiment C In this embodiment a wider variety of cyber threat intelligence sources may be leveraged or accessed using the same D2Web API 130 from sources spanning hacker communities around the globe, including environments such as Chan sites, social media, paste sites, grey-hat communities, Tor (dark-web), surface web, and even highly access-restricted sites (deepweb). This includes over 400 platforms and over 18 languages. Non-English postings may be translated to English using various language translation services. In addition, crawling uses customized lightweight crawlers and parsers for each site to collect and extract data. To ensure collection of cybersecurity-relevant data, machine learning models may be used to retain discussions related to cybersecurity and filter out or remove irrelevant data.

Figure 2:
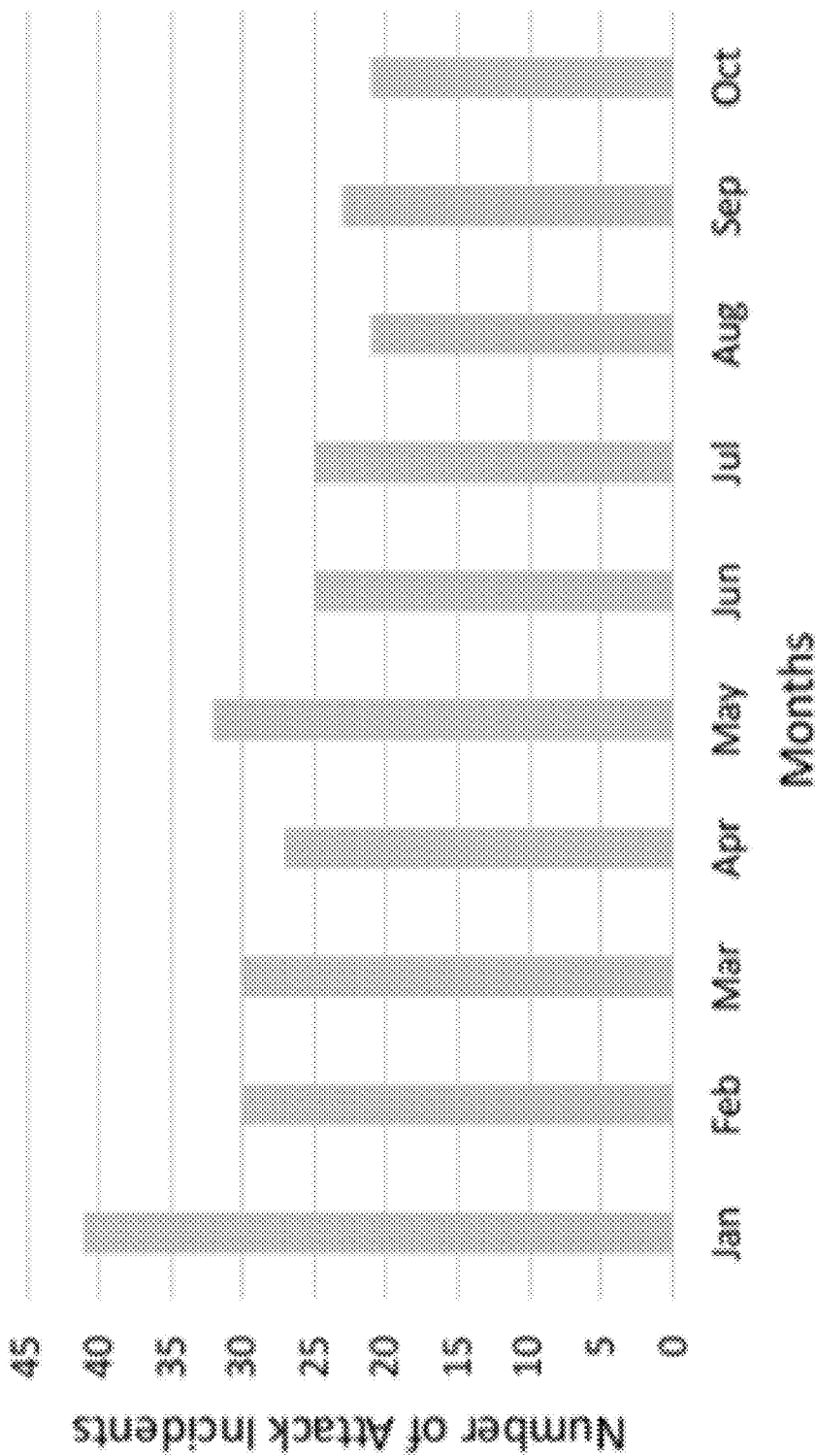
FIG. 2 is a simplified illustration showing a timeline of observations and actions.

Ground Truth: In this embodiment, the ground truth includes a collection of historical records of malicious emails originated from sources that are outside of a Data Providers network. An email is considered malicious if it either has a piece of malware in its attachments, or a link (URL or IP address) to a destination serving malicious content, e.g., malware or phishing. FIG. 2 shows a month-wise distribution of malicious emails observed by Data Provider from January-October, 2019, the last data update from Data Provider. The Data Provider records include events generated by detectors of other attack types such as malicious-destination and endpoint-malware. However, the system has primarily been tested on malicious-email events as the other event types are observed with significantly lower frequency, approaching 0 in some months.

Extracting Indicators of Cyber threat: In this embodiment, two approaches may be used to extract indicators of threats: (1) annotating software vendor and product names corresponding with the software vulnerabilities mentioned in hacker discussions, and (2) annotating spikes in the volume of entity tags identified from the context of those discussions.

Functionality of Data Extraction and Pre-Processing Module (104) for Embodiment D In this embodiment any commercially-available API may be used to supply multi-sourced threat intelligence from sources spanning hacker communities around the globe, including environments such as Chan sites, social media, paste sites, grey-hat communities, Tor, surface web, and even highly access-restricted sites. This includes over 400 platforms and over 18 languages. Non-English postings may be translated to English using the Google translation API. For testing purposes the data may be focused from Jan. 1-Oct. 31, 2018.

Extracting Hacker Activity: The threat intelligence sources used may supply a vast amount of textual content over time. A commercial natural language processing API such as TextRazor, which leverages a wide-range of machine learning techniques (including Recurrent Neural Networks) to recognize entities from the context of postings, may be utilized. Each extracted entity may be associated with a confidence score quantifying the amount of confidence in the annotation. A lower bound may be set on confidence score to only retain entities that are relevant. This approach may use the extracted entities (single entities and itemsets) to learn temporal rules correlating hacker activity with attacks targeting the Data Provider.

Ground Truth: In this embodiment, the ground truth may be a collection of historical records of malicious emails received by the Data Provider from outside sources. An email may be considered malicious if it either has a piece of malware in its attachments, or if it has a link (URL or IP address) to a destination serving malicious content, e.g., malware or phishing.

Possible Implementations of the Learning Module (106)

In some embodiments, the learning module 106 may involve CVE-CPE mapping. In this embodiment, any database storing or having access to the hacker community discussions 132 may be queried using API calls associated with the D2Web API 130 to access forum discussions or marketplace items with software vulnerability mentions (in terms of a CVE number). To identify a CVE number, regular expressions may be used to match the CVE number format. After identifying any such vulnerabilities using the CVE number, corresponding targeted platform products (CPEs) may be identified, including software and/or hardware. In this manner, each of the identified CVEs may be mapped to its respective CPEs. CVEs may also be mapped to nation-state threat actors who are known to frequently exploit a given vulnerability. For instance, a well-known threat actor like the North Korean group Hidden Cobra is known for affecting multiple vulnerabilities in various applications. A list of such threat actors may be created and define what vulnerabilities the threat actors exploited in order to map any identified CVE to these actors. These CPE and nation-state actor mappings may be used as pre-conditions during the rule-learning phase of the learning module 106 discussed herein.

Figure 3:
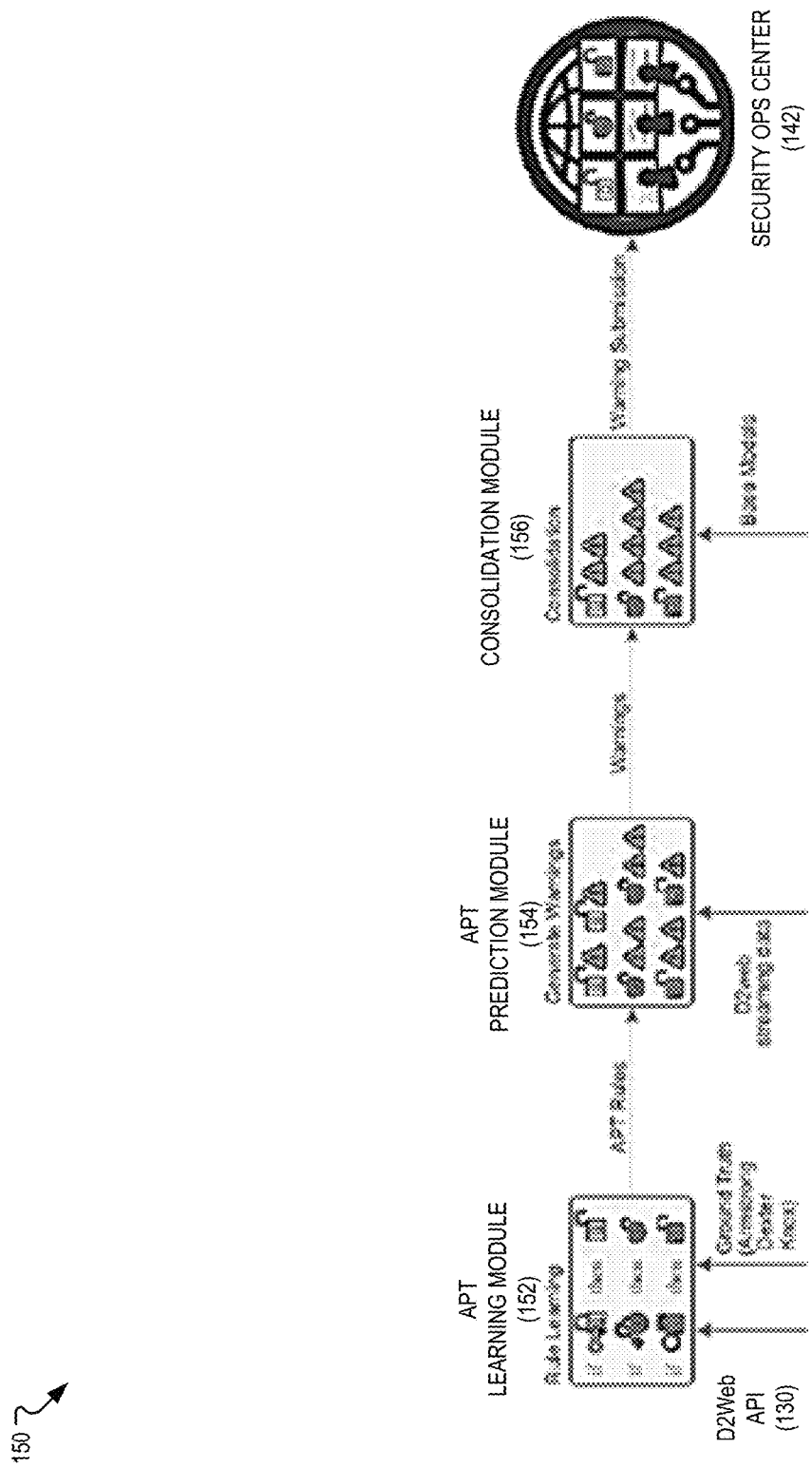
FIG. 3 is an illustration showing a process flow for APT logic rule-based cyber threat prediction.

In some embodiments, the learning module 106 may be configured to generate the rules 136 in the form of APT rules using annotated probabilistic temporal (APT) logic known. The rule learning may take software vulnerability discussions gathered from the D2web (both from forums and marketplaces) and then may map them to a CPE and known nation-state actors. These mappings may then be used to construct rules by using actual attack data (GT 134) made available through the IARPA CAUSE program or otherwise. APT logic is described in further detail below. An example of one embodiment of a framework 150 similar to the framework 101 is shown in FIG. 3. In this embodiment, an APT learning module 152 may be employed to learn APT rules which may be leveraged by an APT prediction module 154 to formulate predictions or warnings based on the APT rules.

In logic, the syntax of the representation language specifies all the sentences that are well formed in the knowledge base, while the semantics define the truth of each sentence with respect to each possible world. The syntax and semantics of APT-logic programs applied to the domain shall now be described.

Annotated Probabilistic Temporal Logic (APT-LOGIC—Syntax)

The existence of a first order logical language $\mathcal{L}$, with a finite set $\mathcal{L}_{cons}$ of constant symbols (which stand for objects), a finite set $\mathcal{L}_{pred}$ of predicate symbols (which stand for relations), and an infinite set $\mathcal{L}_{var}$ of variables may be assumed. The allowable sentences of $\mathcal{L}$ may be defined as set forth below.

Conventions. Constant and predicate symbols may begin with lowercase letters. For example, the constant symbols set_forums_1, debian, malicious-email and the predicate symbols mention_On, attack and multiple_attacks might be used. Differently, variables may be uppercase letters that could be used as arguments of predicates, such as mention_On(X,Y), attack(X) and multiple_attacks(X,Y).

Terms and Atoms. A term is any member of $\mathcal{L}_{cons} \cup \mathcal{L}_{var}$, while ground terms may be present only in $\mathcal{L}_{cons}$. Atomic sentences (atoms) are formed from a predicate symbol followed by a parenthesized list of terms. Each predicate symbol $p \in \mathcal{L}_{pred}$ has an arity that fixes the number of arguments. If $tr_1, tr_n$ are (ground) terms, and $p \in \mathcal{L}_{pred}$, then $p(tr_1, \ldots, tr_n)$ is also a (ground) atom.

Herbrand base (Conditions and Actions). $B_{\mathcal{L}}$ may be used to denote the Herbrand base of $\mathcal{L}$, or its finite set of all ground atoms. Then, $B_{\mathcal{L}}$ may be divided into two disjoint sets: $B_{\mathcal{L}_{\{conditions\}}}$ and $B_{\mathcal{L}_{\{actions\}}}$, so that $B_{\mathcal{L}} \equiv B_{\mathcal{L}_{\{conditions\}}} \cup B_{\mathcal{L}_{\{actions\}}}$. $B_{\mathcal{L}_{\{conditions\}}}$ comprehends the atoms allowed only in the premise of the APT rules, representing conditions or all users' actions performed and collected from dark-web forums, for instance: mention_on(set_forum_1,debian). On the other hand, $B_{\mathcal{L}_{\{conditions\}}}$ comprehends the atoms allowed only in the conclusion of the rules, representing actions or all malicious activities registered and reported by Armstrong company in its own facilities, for instance: attack(malicious-email).

Regular Formulas. Complex sentences (formulas) are constructed recursively from simpler ones, using parentheses and three logical connectives: ($\neg$, negation, $\vee$ disjunction, $\wedge$ conjunction). A (ground) atom is a (ground) formula, and if F and G are (ground) formulas, then $F \vee G$, $F \wedge G$ and $\neg F$ are also (ground) formulas. As specified for atoms, formulas representing conditions may be located only in the premise of APT rules, while formulas representing actions may be located only in the conclusion of those rules.

Time Formulas. If F is a (ground) formula, t is a time point, then $F_t$ is a (ground) time formula stating that F is true at time t. If $\phi$, $\rho$ are (ground) time formulas, then $\neg\phi$, $\neg\rho$, $\phi \vee \rho$ and $\phi \wedge \rho$ are also (ground) time formulas. Throughout, Greek letters $\phi$, $\rho$ p will be used for time formulas and capital letters F, G for regular formulas.

Probabilistic Time Formulas. If $\phi$ is a (ground) time formula and [l, u] is a probability interval $\subseteq [0, 1]$, then $\phi$:[l, u] is a (ground) probabilistic time formula (ptf). Intuitively, $\phi$:[l, u] says $\phi$ is true with a probability in [l, u], or using the complete notation, $F_t$:[l, u] says F is true at time t with a probability in [l, u]. To illustrate the ptf's generation process, consider the image presented in FIG. 2. The image is showing a timeline divided in past incidents (for t∈) and future incidents (for t∈).

Past conditions and actions may be annotated with [1,1], since they refer to facts that have been already observed in the past. A primary goal is to learn the relationship between those past incidents to predict highly likely actions in the future. This goal is accomplished by narrowing the probability boundaries of future actions derived from APT rules that have higher probabilities when compared to their priors. The matrix below illustrates how ptf's corresponding to facts are derived in the knowledge base using the timeline of FIG. 2. Other ptf's that express uncertainty will be added later.

$$\begin{bmatrix} F_1:[1,1] & G_2:[1,1] & F'_3:[1,1] \\ G'_4:[1,1] & G_5:[1,1] & F_6:[1,1] \end{bmatrix}$$

The knowledge base of ptf's illustrated in the matrix above could also be specified as a conjunction of time formulas, as shown below:

$$F_1 \wedge G_2 \wedge F'_3 \wedge G'_4 \wedge G_5 \wedge F_6$$

APT Rules and Programs. Suppose condition F and action G are (ground) formulas, $\Delta t$ is a time interval, [l, u] is a probability interval and $f$ r∈F is a frequency function symbol (these symbols will be defined together with formal APT semantics).

Then $$F \overset{fr}{\leadsto} G: [\Delta t, l, u]$$

is an (ground) APT (Annotated Probabilistic Temporal) rule. The rule checks the probability that G is true within $\Delta t$ units after F becomes true. Consider for instance, the following APT rule in a cyber domain:

mention_on(set_forum_1, debian)

$$\overset{fr}{\leadsto} \text{attack (malicious- email): } [3, 0.4, 0.5]$$

This rule is informing the probability of Armstrong company being attacked by a malicious-email, within three time units after users mention "debian" on a set of forums (forums_1), is between 40% and 50%. APT Rules with tight boundaries like this one, where the lower bound value considerably exceeds the prior probability of having the corresponding cyberattack (action), produce precise information that can be leveraged by companies to allocate their limited resources and patch vulnerabilities. Naturally, an APT logic program is a finite set of APT rules and ptf's, that unless specified otherwise, may be used as ground in this context.

Annotated Probabilistic Temporal Logic (APT-LOGIC—Semantics)

A formal declarative semantics for APT-logic programs will now be described.

World: A world is any set of ground atoms that belong to $B_\mathcal{L}$. The power set of $B_\mathcal{L}$ (denoted $2^{B_\mathcal{L}}$) is the set of all possible worlds (Herbrand interpretations) that describe possible states of the domain being modeled by an APT-logic program. A few possible worlds in this domain are listed below:

{mention_on(set_forums_1,debian),mention_on(set_forum_1, (microsoft-office))}
{mention_on(set_forums_1,debian)}
{attack(malicious-email)}
{multiple_attacks(malicious-email,2)}
{ }

A world w satisfies a ground formula F (denoted $w \models F$), if the following four conditions hold:
If F=a for some ground atom a, then a∈w;
If F=¬G for some ground formula G, then w does not satisfy G;
If $F=F_1 \wedge F_2$ for some ground formulas $F_1$ and $F_2$, then w satisfies $F_1$ and w satisfies $F_2$;
If $F=F_1 \vee F_2$ for some ground formulas $F_1$ and $F_2$, then w satisfies $F_1$ or w satisfies $F_2$.

Figure 4:
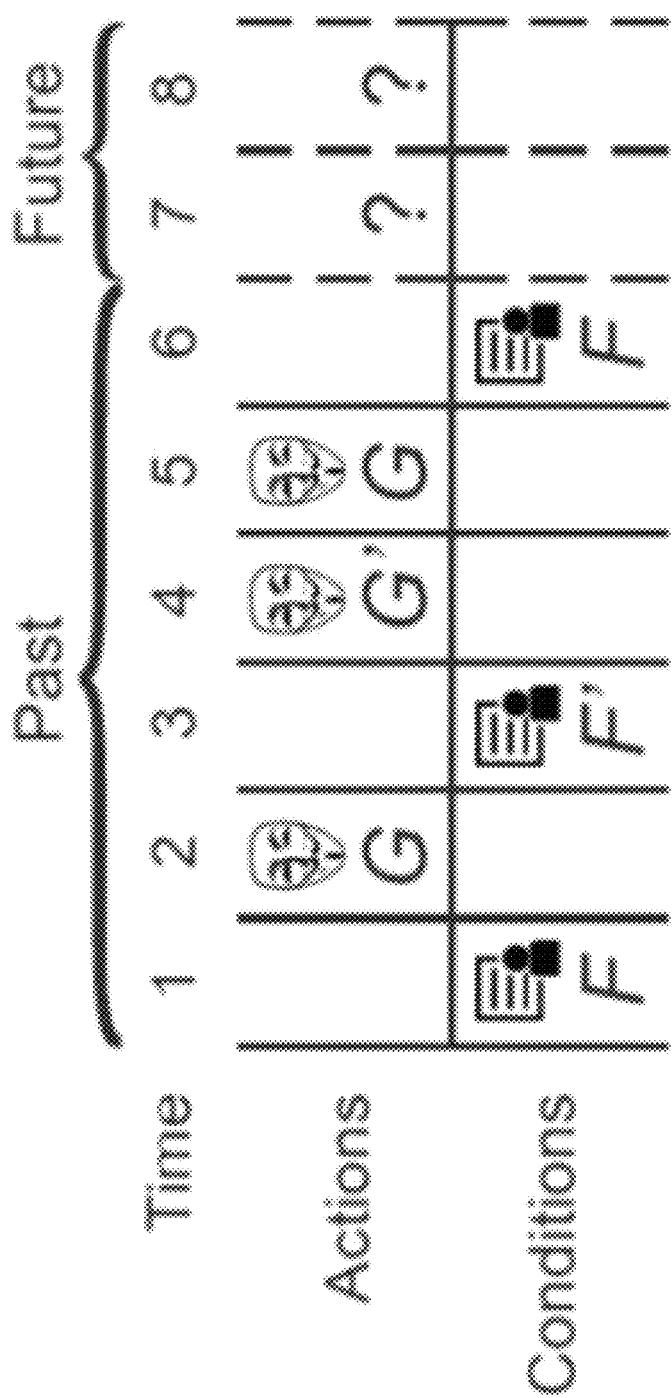
FIG. 4 is an illustration depicting a scenario for past and future cyber incidents.
Figure 5:
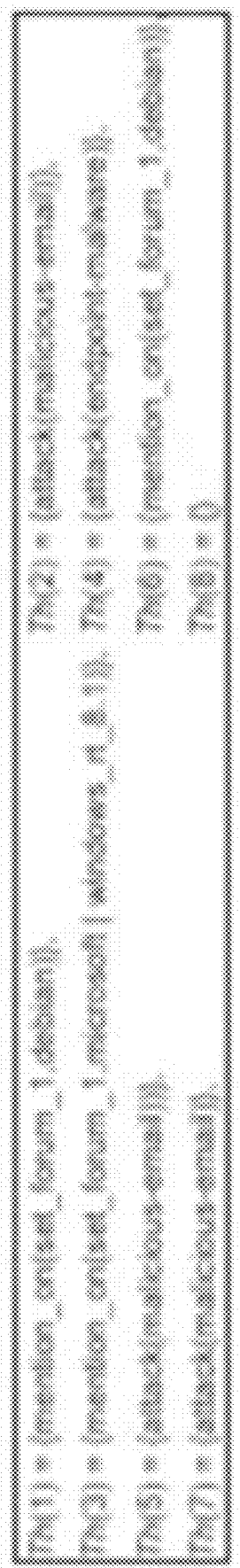
FIG. 5 is an image that shows a thread that considers the scenario shown in FIG. 4, including past and future incidents.

Thread: It may be assumed that all applications are interested in reasoning about a large but fixed size interval of time, and that $\tau=\{1, \ldots, t_{max}\}$ denotes the set of time points the present system is interested in. A thread is a mapping $Th(1, \ldots, t_{max}) \rightarrow 2^{B_\mathcal{L}}$ that models the domain using worlds that evolve over time, or in this specific case, over $\tau$. Th(i) specifies that according to the thread Th, the world at time i will be Th(i). Given a thread Th and a ground time formula $\phi$, then Th satisfies $\phi$ (denotes $Th \models \phi$) if:
If $\phi \equiv F_t$ for some ground time formula $F_t$, then Th(t) satisfies F;
If $\phi \equiv \neg \rho$ for some ground time formula $\rho$, then Th does not satisfies $\rho$;
If $\phi \equiv \rho_1 \wedge \rho_2$ for some ground time formulas $\rho_1 \wedge \rho_2$, then Th satisfies $\rho_1$ and Th satisfies $\rho_2$;
If $\phi \equiv \rho_1 \vee \rho_2$ for some ground time formulas $\rho_1$ and $\rho_2$, then Th satisfies $\rho_1$ or Th satisfies $\rho_2$;

For additional explanation, reference is made to FIGS. 4-5, where FIG. 5 presents a thread that considers the scenario illustrated in FIG. 4 including past and future incidents.

This thread is showing how users are posting on darkweb forums and how cyber-attacks are conducted over time until time point 8. As observed, there is a malicious-email attack suffered by Armstrong company at t=7. This is the type of action the present disclosure wants to predict using APT logic. For the sake of simplicity, it will be assumed in the present disclosure that the existence of a single thread Th corresponds to the historical corpus of data. The thread is used to consider the case when a ground time formula $\phi$ entails another ground time formula. Thus, $\phi \models$ iff $Th \models \phi$ then $Th \models \rho$.

Frequency Functions: One of the ways APT-logic separates itself from past work is the introduction of the frequency functions. The basic intuition behind a frequency function is to represent temporal relationships within a thread, checking how often a world satisfying formula F is followed by a world satisfying formula G. Formally, a frequency function f r maps quadruples of the form (Th, F, G, $\Delta t$) to [0,1] of real numbers.

Presently, there are two different ways to define a frequency function from the historical data. The first one is the Point Frequency Function (pfr), which specifies how frequently the action G follows the condition F in exactly $\Delta t$ time points, expressing what is desired where there is a precise temporal relationship between events. The second one is the Existential Frequency Function (pfr), which specifies how frequently the action G follows the condition F within $\Delta t$ time points, allowing the action to fall within some specified period of time rather than after exactly $\Delta t$ units of time.

Although both frequency functions are capable to quantify the temporal relationship between conditions and actions within this thread, it was realized that they strongly rely on the value of $t_{max}$. This fact may produce some problems for the present model, since different values for $t_{max}$ in a retraining process can deeply interfere in the accuracy of predictions. Thus, the present disclosure discloses alternative definitions for both frequency functions that could avoid this weakness. In order to accomplish that, the present system first may specify how a ptf can be satisfied in the model. If the present systems considers the ptf $F_t$: [l, u], and some A'∈A, where A is the set of all ptf's satisfied by the thread Th, then $Th \models F_t[l, u]$ iff:

If F=a for some for some ground a, then $\exists a_t$:[l', u']∈A s.t. [l', u'] ⊒ [l, u];
If $F_t[l, u]=\neg F'_t[l, u]$ for some ground formula F', then $Th \models F'_t$:[1-u, 1-l];
If $F_t[l, u]=F'_t[l, u] \wedge F''_t[l, u]$ for some ground formulas F' and F'', then $Th \models F'_t[l, u]$ and $Th \models F''_t[l, u]$;
If $F_t[l, u]=F'_t[l, u] \vee F''_t[l, u]$ for some ground formulas F' and F'', then $Th \models F'_t[l, u]$ or $Th \models F''_t[l, u]$;

The new formulations of both frequency functions, starting with pfr in Equation 1 are disclosed below:

$$pfr(Th, F, G, \Delta t) = \left[ \frac{t \mid Th \models F_t: [l, u] \wedge \sum_{Th \models G_{t+\Delta t}: [l', u']} l'}{\sum_{t \mid Th \models F_t: [l,u]} u}, \right.$$

$$\left. \frac{t \mid Th \models F_t: [l, u] \wedge \sum_{Th \models G_{t+\Delta t}: [l', u']} u'}{\sum_{t: Th \models F_t: [l,u]} l} \right] \quad (1)$$

In this context, the ptf's $F_t$:[l, u] and $G_{t+\Delta t}$:[l', u'] will represent facts already observed in the past and can be annotated with [1,1]. This formalization is general enough to capture situations when the ptf's are representing uncertainty in the interval [0,1]. In addition, the values of both frequency functions may be calculated using probability intervals instead of point probabilities. Finally, the new formal definition of ef r in Equation 2 is set forth below:

$$efr(Th, F, G, \Delta t) = \left[ \frac{t \mid Th \models F_t: [l, u] \wedge \sum_{Th \models \cup_{i=1}^{\Delta t} G_{t+i}: [l', u']} l'}{\sum_{t \mid Th \models F_t: [l,u]} u}, \right. \quad (2)$$

-continued $$\frac{t \mid Th \mid = F_t:[l, u] \wedge \sum_{Th \mid = \cup_{i=1}^{\Delta t} G_{t+i}:[l',u']} u'}{\sum_{t: Th \mid = F_t:[l,u]} l} \quad\quad (5)$$

Satisfaction of APT Rules and Programs. In the qualitative case of a formal logic, a Herbrand interpretation is defined as a mapping $B_\mathcal{L} \to$ false, true. In the quantitative case of APT logic, the mapping range is the interval [0,1] of real numbers. If T is considered as the set of time points that comprise Th, the mapping $B_\mathcal{L} \times T \to [0,1]$ can be thought of as the membership function characterizing a "fuzzy" subset of $B_\mathcal{L}$ over Th.

As done before for the frequency functions, the membership function is measured using probability intervals. Then, the fuzzy subset of $B_\mathcal{L}$ over Th will be the mapping $B_\mathcal{L} \times T \to [0,1] \times [0, 1]$, which assigns probability intervals to the worlds over the time points of the single thread Th. Then Th satisfies an APT Rule:

$$F \stackrel{fr}{\leadsto} G: [\Delta t, l, u](\text{denotes } Th \mid = F \stackrel{fr}{\leadsto} G: [\Delta t, l, u]) \textit{iff}: \quad (3)$$
$$fr(Th, F, G, \Delta t) \subseteq [l, u]$$

Equation 3 checks if the probability interval calculated by the frequent function f r(Th, F, G, $\Delta$t) is within the range [l, u] of the APT rule to be satisfied. The present system specifies in Equation 4 the entailment relationship between both frequency functions:

$$\text{If } Th \mid = \quad\quad (4)$$
$$\bigcup_{i=1}^{\Delta t} \{F \stackrel{pfr}{\leadsto} G: [i, l_i, u_i]\} \text{ then } Th \mid = F \stackrel{efr}{\leadsto} G: [\Delta t, \max(l_i), \min(u_i)]$$

Annotated Probabilistic Temporal Logic (Embodiment D)

In one embodiment of the system, a subset of the previously introduced APT-logic syntax and semantics may be used. The existence of a set of atoms A may be assumed and partitioned into two disjoint sets: condition atoms, denoted $a_{condition}$, and action atoms, denoted $a_{action}$. $a_{condition}$ describes hacker activities and may have a single predicate spike($f$), i.e., $f \in A_{var}$, and $A_{var}$ is a finite set of variables $a_{action}$. describes external targeted attacks and may have a single ground atom $a_{attack}$. Condition atoms $a_{condition}$ may be connected using conjunction (i.e., $\wedge$) to form condition formulas. A world is any set of ground atoms. A thread Th is a mapping of worlds to discrete time points—and time granularity may be fixed to days. Time points are represented by natural numbers, ranging from 1, . . . , $t_{max}$. A thread Th may satisfy a formula F at a time point t (denoted Th(t)$\models$F) iff: $\forall_{a \in F}$(Th(t)$\models$a). The existence of a single thread Th may be assumed from which the APT-logic program may be computed.

To compute the probability of Th(t+$\Delta$t)$\models$$a_{attack}$ conditioned on Th(t)$\models$F, the point frequency function (pfr) concept may be used, which is a mapping of quadruples of the form (Th, F, $a_{attack}$, $\Delta$t) to a probability p. This mapping can be modeled in APT-logic programming defining a set of pfr rules of the form:

$$F \stackrel{pfr}{\leadsto} a_{attack}: [\Delta t, p] \quad\quad (1)$$

wherein F and $a_{attack}$ may be assigned as the pre- and post-conditions of the rule, respectively. Additionally, the probability of a rule may be determined based on the fraction of times its post-condition is satisfied at t+$\Delta$t after the times its pre-condition is satisfied at t. |•| may be used to denote set cardinality:

$$pfr(Th, F, a_{attack}, \Delta t) = \frac{|\{t \mid Th(t) \mid = F \wedge Th(t + \Delta t) \mid = a_{attack}\}|}{|\{t \mid Th(t) \mid = F\}|} \quad (2)$$

The goal of the system at this stage may be to learn pfr rules whose probability is higher than the prior probability of, $a_{attack}$ (i.e., pfr (pfr Th, F, $a_{attack}$, $\Delta$t)>pfr(Th, $\phi$, Th $a_{attack}$, $\Delta$t)). If this condition is not met, the system may not consider the temporal correlation between F and $a_{attack}$ to be significant, hence excluding it from the APT-logic program.

Extracting Entity Tags (Embodiment C)

The threat intelligence sources that may be used in this embodiment may supply a vast amount of textual content over time. A commercial natural language processing API may be utilized that leverages a wide-range of machine learning techniques (including Recurrent Neural Networks) to recognize entities from the context of postings. Each extracted entity is associated with a confidence score quantifying the amount of confidence in the annotation. A lower bound on confidence score may be set to only retain entities that are relevant. Two steps may be taken to extract the final indicators: (1) annotating spikes in the volume of individually extracted tags, and (2) for those tags, identifying sets that frequently spike together.

Annotating spiking tags: To gain an understanding of abnormal hacker activities that could possibly correlate with the attack events, abnormal activities may be defined, and those definitions used as preconditions of APT-logic rules. These definitions may or may not correlate with actual attack events, but the APT-logic program may only contain the rules whose precondition is found to correlate with the attack events. To identify such abnormalities, common entity tags may be considered that appear in most of the days, i.e., appear in 90 days or more as training periods are always 180 days. An entity may be regarded as abnormal if it is observed on a given day with a spiking volume—spikes may be determined when the count of times an entity is observed exceeds a moving median added to a multiplier of a moving standard deviation.

For instance, let F be an itemset i.e.:

$$F = \{\text{spike}(f_1), \ldots, \text{spike}(f_n) \mid \forall i \in \{1, \ldots, n\}: f_i \in a_{var}\}$$

The existence of three utility functions may be assumed:
1. count($f$, t), which returns the number of time an entity $f$ is extracted on day t,
2. median($f$, t, window), which returns the median of set S:

$$S = \{\text{count}(f, i) \mid i \in \{t-\text{window}, \ldots, t\}\}$$

3. stDiv(f, t, window), which returns the standard deviation of S.

The thread Th satisfies a predicate spike(f) at some time point t, denoted Th(t) spike(f) iff:

count(f,t)>(median(f,t,window)+(multiplier×stDiv(f,t,window)))

Extracting Entity Tags (Embodiment D)

Identifying Threat Indicators (Annotating abnormalities): In order to gain an understanding of abnormal hacker activities that possibly correlate with the attack events, abnormal activities may be defined and used as preconditions in this approach. They may or may not correlate with actual attack events, but the APT-logic program may contain the rules whose precondition is found to correlate with the attack events. To identify such abnormalities, common entities may be considered.

Common entitles: Common entities may be defined as entities that appear in most of the days. An entity may be regarded as abnormal if it is observed on a given day with a spiking volume—spikes are determined when the count of times an entity is observed exceeds a moving median added to a multiplier of a moving standard deviation.

For instance, let F be an itemset i.e., $\{spike(f_1), \ldots, spike(f_n) | \forall i \in \{1, \ldots, n\}: f_i \in A_{var}\}$. The existence of three utility functions may be assumed: (1) count(f, t), which returns the number of time an entity f is extracted on day t, (2) median(f, t, window), which returns the median of set S={count(f, i)|i∈{t−window, . . . , t}}, and (3) stDiv(f, t, window), which returns the standard deviation of S.

The thread Th satisfies a predicate spike(f) at some time point t, denoted Th(t) spike(f) iff:

count(f,t)>(median(f,t,window)+(multiplier H stDiv(f,t,window)))

Frequent Itemset Mining: As explained, preconditions could be atoms or a formula (i.e., an itemset). A primary consideration is precondition formulas that are frequently satisfied in the historical data. An Apriori algorithm may be used in this consideration. The Apriori algorithm may take as input a database of transactions—the annotated hacker abnormal activities may be grouped by days, each day corresponding to a transaction. The algorithm may then produce all itemsets of hacker activities that are frequently observed together. The identified itemsets may be considered as preconditions for the APT-logic program.

Rule Learning—Rule-Learning Algorithms

Computing Probability Intervals. The probability intervals related to all pairs [l, u] specified in the present disclosure are derived using the standard deviation of the corresponding point probability in a binomial distribution, considering the formula in Equation 5.

$$\sigma = \frac{\sqrt{support\_F * p * (1-p)}}{support\_F} \quad (5)$$

where support_F is the number of times the precondition or F is observed.

Rule Learning—APT Programs

The algorithms disclosed herein only add to the logic programs the rules with lower bounds exceeding the prior probability of the rule heads happening in any random time period of the same length as the rule's Δt days in the case of efr, and 1 day in the case of pfr.

If a rule is triggered due to a vulnerability mention, it may or may not result in generating warnings. The warning generation and fusion is less straightforward. In the case of efr, if more than one rule is triggered on the same day, the rule that predicts the attacks with the highest point probability will result in a warning. Additionally, if the validity time period of a new warning falls within a validity time period of an existing warning, the new warning may be cancelled, and the probability of the existing warning may be updated if the new warning predicts the attack with a higher probability.

In the case of pfr, the problem is to identify whether a triggered rule should generate warnings, and the number of warnings to generate. When there are no rules predicting attacks on a given day, no warnings are generated. As mentioned before, the present system may not assume the Markov property (i.e., the preconditions of different rules are independent if they happen on different days). Therefore, when two rules are triggered on different days, and they predict the same attack type that will occur on the same day, they both result in warnings; if both are qualified to generate warnings. It was also assumed that rule heads are only dependent on rule bodies. Therefore, if two rules are triggered on the same day, both predict the same attack type on the same day, and one predicts x number of attacks while the other predicts y number of attacks, then they will generate x+y warnings; if both are qualified to generate warnings. A pfr r∈R is qualified to generate x number of warnings (i.e., the head of r is attackNumber(attType, x), if (1) it is triggered, and (2) there is no other rule r'∈R is triggered on the same day, with the same rule head and Δt as r's, and r''s point probability is greater than r's.

Sliding Window for Existential Frequency Rules—(Embodiment B)

The current semantic structure of APT-logic may not capture the concept of efr whose precondition atoms occur in any order within a sequence of Δt time-points. However, the efts sought to be obtained use such semantic. To do so, the APT-logic was used, but a new thread Th' was made by assigning the atoms that Th satisfies at each time-point t to Th'(t), and for each of the next Δx time-points, according the logic below:

$$\forall_{a \in A, t \in [l, \ldots, t_{max}]}(Th(t) \models a \rightarrow (\forall_{x \in [t, \ldots, min(t+\Delta x, t_{max})]} (Assign(Th(x), a))))$$

Where the function Assign(Th'(x), a) assigns an atom a to the thread Th' at time-point x (i.e., Th'(x)⊨a).

Item Sets for Existential Frequency Rules (Embodiment B)

The preconditions of the efrs are frequent itemsets obtained from running the Apriori algorithm. The input to the Apriori algorithm is a thread-like dataset, i.e., a sequence of events in discrete time-points. The output is all combinations of events that are satisfied by the thread and occur with a frequency exceeding a minimum support. A thread Th' was generated, and run the Apriori algorithm on that thread, which returns a set of frequent itemsets (denoted freqItemsets). Then a thread Th$_{itemsets}$ was made containing only atoms (frequent itemsets) that Th' satisfies at each time-point as follows:

$$\forall_{I \in freqItemsets, t \in [l, \ldots, t_{max}]}(I \subseteq Th'(t) \rightarrow (Assign(Th_{itemsets}(t), I)))$$

Computing Device

Referring to FIG. 9, a computing device 200 may be used to implement various aspects of the framework 101 described herein. More particularly, in some embodiments, aspects of the framework 101 may be translated to software or machine-level code, which may be installed to and/or executed by the computing device 200 such that the computing device 200 is configured to learn rules and formulate predictions associated with cyber threats as described herein. It is contemplated that the computing device 200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 200 may include various hardware components, such as a processor 202, a main memory 204 (e.g., a system memory), and a system bus 201 that couples various components of the computing device 200 to the processor 202. The system bus 201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 may further include a variety of memory devices and computer-readable media 207 that includes removable/non-removable media and volatile/non-volatile media and/or tangible media, but excludes transitory propagated signals. Computer-readable media 207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 204 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 202. Further, a data storage 206 stores an operating system, application programs, and other program modules and program data.

The data storage 206 may also include other removable/non-removable, volatile/nonvolatile computer storage media. For example, data storage 206 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 200.

A user may enter commands and information through a user interface 240 (displayed via a monitor 260) by engaging input devices 245 such as a tablet, electronic digitizer, a microphone, keyboard, and/or pointing device, commonly referred to as mouse, trackball or touch pad. Other input devices 245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 245 are in operative connection to the processor 202 and may be coupled to the system bus 201, but may be connected by other interface and bus structures, such as a parallel port, game port or a universal serial bus (USB). A monitor 260 or other type of display device may also be connected to the system bus 201. The monitor 206 may also be integrated with a touch-screen panel or the like.

The computing device 200 may be implemented in a networked or cloud-computing environment using logical connections of a network interface 203 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 200 may be connected to a public and/or private network through the network interface 203. In such embodiments, a modem or other means for establishing communications over the network is connected to the system bus 201 via the network interface 203 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

Certain embodiments are described herein as including one or more modules 212. Such modules 212 are hardware-implemented, and thus include at least one tangible unit capable of performing certain operations and may be configured or arranged in a certain manner. For example, a hardware-implemented module 212 may comprise dedicated circuitry that is permanently configured (e.g., as a special-purpose processor, such as a field-programmable gate array (FPGA) or an application-specific integrated circuit (ASIC)) to perform certain operations. A hardware-implemented module 212 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 212 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 212 are temporarily configured (e.g., programmed), each of the hardware-implemented modules 212 need not be configured or instantiated at any one instance in time. For example, where the hardware-implemented modules 212 comprise a general-purpose processor configured using software, the general-purpose processor may be configured as respective different hardware-implemented modules 212 at different times. Software may accordingly configure a processor 202, for example, to constitute a particular hardware-implemented module at one instance of time and to constitute a different hardware-implemented module 212 at a different instance of time.

Hardware-implemented modules 212 may provide information to, and/or receive information from, other hardware-implemented modules 212. Accordingly, the described hardware-implemented modules 212 may be regarded as being communicatively coupled. Where multiple of such hardware-implemented modules 212 exist contemporaneously, communications may be achieved through signal transmission (e.g., over appropriate circuits and buses) that connect the hardware-implemented modules. In embodiments in which multiple hardware-implemented modules 212 are configured or instantiated at different times, communications between such hardware-implemented modules may be achieved, for example, through the storage and retrieval of information in memory structures to which the multiple hardware-implemented modules 212 have access. For example, one hardware-implemented module 212 may perform an operation, and may store the output of that operation in a memory device to which it is communicatively coupled. A further hardware-implemented module 212 may then, at a later time, access the memory device to retrieve and process the stored output. Hardware-implemented modules 212 may also initiate communications with input or output devices.

Consolidation: One other possible component of the framework 101 may involve functionality to fuse warnings from various heterogeneous models (including DARKMENTION), populate any missing warning fields according to the program requirement, and generate the final version of each warning. This completed warning may then be submitted to the Security Operations Center. Each warning submitted may be available to view and drill down into using a Web UI and Audit Trail analysis capability. This audit trail may go from the submitted warning all the way through model fusion, the individual models, and each individual model's raw data used to generate a warning. In the case of DARKMENTION, this would include the D2web postings/items with the CVE's mentioned highlighted.

Experimental Results—(Embodiment A)

In this section, evidence is provided regarding the viability of the present system through a series of experiments. The warnings that are generated by this model, along with warnings from other models, are being evaluated by the Security Operations Centers (SOCs) on a monthly basis. However, since the external evaluations are aggregated for all models, and DARKMENTION was not operationally deployed until after the time periods those reports cover, DARKMENTION was internally evaluated. Now, the experimental settings that were followed will be explained and the evaluation metrics used to evaluate the warnings generated from the present model.

Experimental Settings

Evaluations were performed on the warnings targeting Armstrong that were submitted during July, August, and September of 2017. The results are aggregated per months for the experiments on Armstrong data while aggregated on periods of 7-days for Dexter. The latter started from July 1 to Jul. 28, 2016. These time windows differ because the Armstrong dataset covers longer period of time as compared to the period covered by Dexter, and there is no more GT data about Dexter that is going to be provided or evaluated by the program. The reported records of Malicious Destination for Dexter only cover a time period that ends before the testing time period starts, hence they are not evaluated.

Evaluation Metrics

To evaluate the accuracy of the present system, three metrics were used: recall, which corresponds to the fraction of GT events that have matching warnings from the total number of GT events; precision, which is the fraction of warnings that have matching GT events from the total number of the generated warnings; and F1, which is the harmonic mean of recall and precision. Table 3 summarizes the evaluation metrics.

TABLE 3

Evaluation metrics

| Metric | Formula |
|---|---|
| Recall | $\dfrac{No.\ of\ matched\ GT\ events}{No.\ of\ GT\ events}$ |
| Precision | $\dfrac{No.\ of\ matched\ warnings}{No.\ of\ warnings}$ |
| F1 | $2 * \dfrac{precision * recall}{precision + recall}$ |

Matching Warnings and GT Events. The matching problem is to find whether a warning w earns credit for predicting a GT attack event g. If w predicts an attack with different type than g's, or w predicts an attack on a different day than the occurrence day of g, then they do not match. Otherwise, they may or may not match based on whether or not w or g have already been paired up with another GT event or a warning, respectively.

To join together warnings with GT events in parings while ensuring that resultant pairings are mutually exclusive, the Hungarian assignment algorithm was used. Intuitively, the algorithm takes as input an n*n matrix representation of (−1*lead-time). Lead-time is the time between warnings and GT events that are qualified to match. Then, the algorithm returns a solution S that maximizes the total lead-time. Here, S is a set of pairs, each maps a warnings to a GT event such that the pairs are guaranteed to be mutually exclusive. The database stored the pairs that were returned by the algorithm.

Results

It was found that the present system outperforms a baseline system that randomly generates x number of warnings on each day such that each value of x has a chance proportional to its frequency of occurrence in the historical data. The baseline was repeated for 100 runs and took the average of each metric. In the real-time deployment of DARKMENTION, human experts can evaluate the warnings by leveraging the other capabilities of the system through a Web UI dashboard. However, in those experiments any triggered rule may be counted, which may not necessarily be important given other details. Nevertheless, the present system scored significantly higher than the baseline system as shown in Table 4.

ground truth data and on the spiking tags observed in the 6-month-period preceding the testing month. Then, for each day in the testing month, the system may generate warnings by matching the spiking tags observed on that day with preconditions of rules in the APT-logic program. If a match exists, a warning may be generated for the day corresponding with the value of Δt of the triggered rule.

Time-series forecasting baseline: The IARPA may be used as a baseline model that reads a training data of the Data Providers ground truth events and may model weekly/daily time seasonality using a simple, constant base-rate model that calculates the average frequency of events from the training data. Using this approach, the model is fitted to ground truth data from all the months prior to the testing month and the model may be used to generate warnings for the testing month.

Evaluation (Pairing ground truth events with warnings): To receive a score, each warning may be paired up with a single ground truth event occurring within the same day, or one day after the attack prediction date, i.e., 1-to-1 relationships. To do so, a Hungarian assignment algorithm may be used to solve the warning-to-ground truth assignment problem, with the objective to maximize warning-to-attack lead time. The results of the Hungarian algorithm (i.e., warning-to-ground truth assignments) may be used to evaluate the performance of the system.

TABLE 4

The evaluation results. A simple baseline model that generates x number of warnings on each day based on the prior probability of each possible value of x that was seen in the training data.

| Dataset | type | Testing starts | #GT-events | DARKMENTION | | | | Baseline* (average of 100 runs) | | | | % increase in F1 |
|---|---|---|---|---|---|---|---|---|---|---|---|---|
| | | | | #warnings | Precision | Recall | F1 | #warnings | Precision | Recall | F1 | |
| Armstrong | M-E | Jul-17 | 24 | 32 | 0.313 | 0.417 | 0.357 | 11.759 | 0.417 | 0.205 | 0.271 | 32% |
| | | Aug-17 | 11 | 3 | 1.000 | 0.273 | 0.429 | 11.966 | 0.289 | 0.315 | 0.299 | 43% |
| | | Sep-17 | 13 | 18 | 0.167 | 0.231 | 0.194 | 12.793 | 0.249 | 0.249 | 0.247 | −21% |
| | M-D | Jul-17 | 4 | 12 | 0.167 | 0.500 | 0.250 | 3.534 | 0.099 | 0.091 | 0.090 | 178% |
| | | Aug-17 | 9 | 23 | 0.174 | 0.444 | 0.250 | 3.121 | 0.232 | 0.086 | 0.120 | 108% |
| | | Sep-17 | 3 | 10 | 0.100 | 0.333 | 0.154 | 2.948 | 0.071 | 0.075 | 0.068 | 126% |
| | E-M | Jul-17 | 14 | 10 | 0.300 | 0.214 | 0.250 | 8.552 | 0.326 | 0.200 | 0.242 | 3% |
| | | Aug-17 | 18 | 45 | 0.200 | 0.500 | 0.286 | 9.155 | 0.324 | 0.168 | 0.217 | 32% |
| | | Sep-17 | 17 | 21 | 0.286 | 0.353 | 0.316 | 8.879 | 0.247 | 0.127 | 0.164 | 93% |
| Dexter | M-E | 1-Jul-16 | 2 | 13 | 0.150 | 1.000 | 0.267 | 2.720 | 0.157 | 0.205 | 0.169 | 58% |
| | | 8-Jul-16 | 7 | 10 | 0.300 | 0.714 | 0.588 | 2.610 | 0.633 | 0.253 | 0.348 | 69% |
| | | 15-Jul-16 | 9 | 5 | 0.333 | 0.222 | 0.267 | 2.770 | 0.619 | 0.188 | 0.276 | −3% |
| | | 22-Jul-16 | 4 | 2 | 0.500 | 0.250 | 0.333 | 3.050 | 0.469 | 0.355 | 0.385 | −14% |
| | E-M | 1-Jul-16 | 1 | 2 | 0.500 | 1.000 | 0.667 | 1.700 | 0.189 | 0.330 | 0.226 | 195% |
| | | 8-Jul-16 | 3 | 4 | 0.250 | 0.333 | 0.286 | 1.750 | 0.243 | 0.167 | 0.186 | 54% |
| | | 15-Jul-16 | 3 | 1 | 1.000 | 0.333 | 0.500 | 1.740 | 0.281 | 0.190 | 0.217 | 130% |
| | | 22-Jul-16 | 4 | 2 | 0.300 | 0.250 | 0.333 | 1.780 | 0.383 | 0.208 | 0.257 | 30% |

Runtime Analysis—(Embodiment B)

Figure 6:
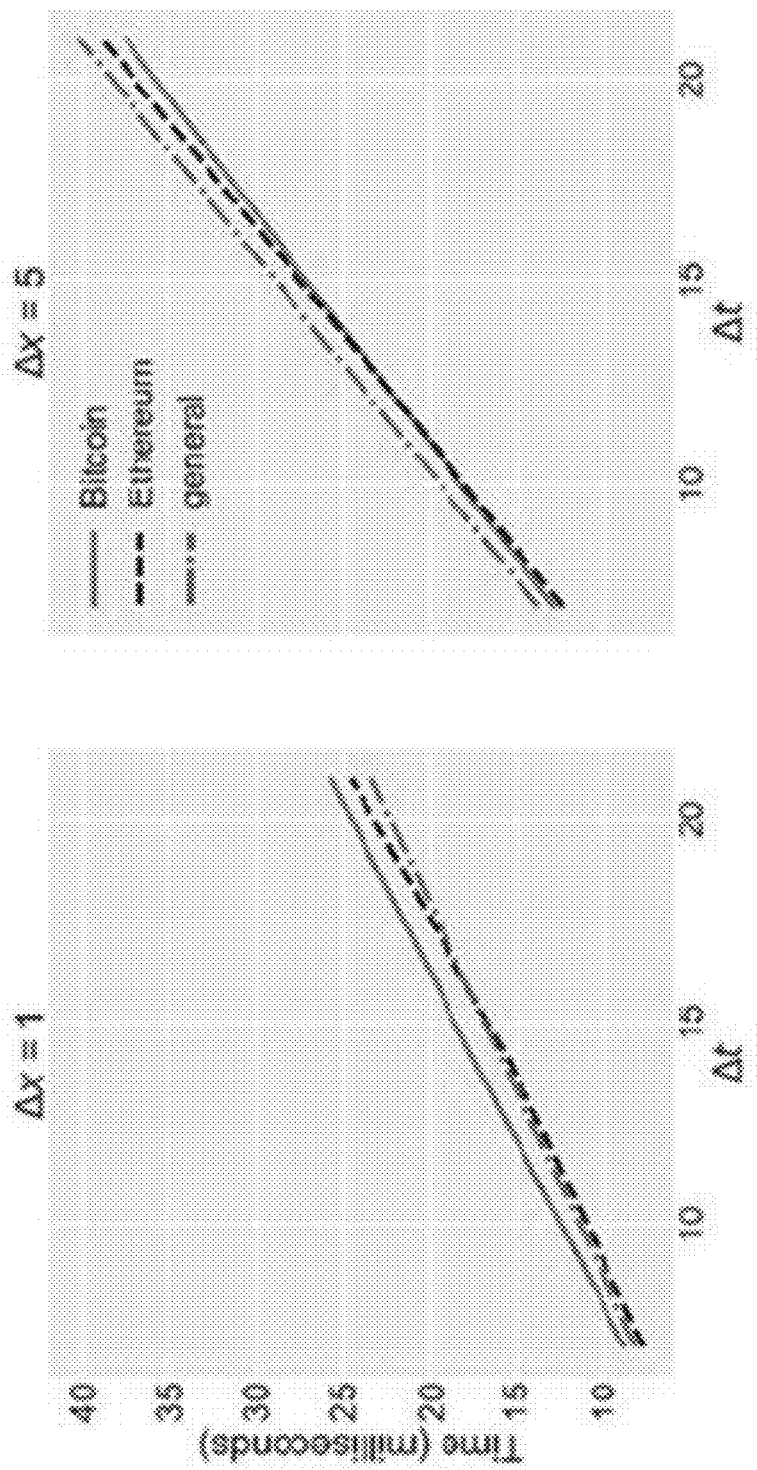
FIG. 6 is a graphical representation of the time taken to generate rules when varying $\Delta t$.

FIG. 6 shows that when the length Δt increases, the time taken for algorithm to generate the rules increases linearly. This is because that the number of time-points for which algorithm may use to check the satisfaction of the consequence increases. This shows that the approach can scale well with datasets having a large number of time-points and tags. However, the Apriori algorithm runs in exponential time, and for all analysis in this study, the number of items was restricted to 2 in each itemset.

Experimental Results (Embodiment C)

Experimental Setup

Training/testing splits: To produce the APT-logic program, an APT-EXTRACT algorithm may be used on the

TABLE 5:

Evaluation metrics. TP—true positives, FP—false positives, FN—false negatives, TN—true negative.

| Metric | Formula |
|---|---|
| Precision | $\frac{TP}{TP+FP}$ |
| Recall | $\frac{TP}{TP+FN}$ |
| F1 | $2 \cdot \frac{\text{precision} \cdot \text{recall}}{\text{precision} + \text{recall}}$ |

Evaluation metrics: Standard evaluation metrics, namely precision, recall, and F1, may be used. Precision is the fraction of warnings that match ground truth events, recall is the fraction of ground truth events that are matched, and F1 is the harmonic mean of precision and recall. Table 5 above summarizes the used metrics. Using these metrics, a performance comparison is presented between the system and the baseline model. Additionally, a fused model is shown that can benefit from the temporal correlations and statistical characteristics captured by the system and the baseline model, respectively.

Experimental Results

Fusion: A simple combining strategy may be used to test the performance of a fused model. The warnings from the two models, i.e., the system and the baseline, may first be combined. The warnings may be grouped by their generation date and prediction data. Then, half of the warnings may be removed from each group in order to leverage the power of the individual approaches while limiting their intersection, i.e., removing half of the duplicate warnings.

Parameter tuning: The condition on what rules to be considered in the APT-logic program, i.e., rules whose probability is higher than the prior probability of the post-condition, may not guarantee the highest performance. Therefore, the classical Grid search method may be used to find optimal minimum thresholds on rule probability and support (i.e., the numerator of Equation 2). The parameter values that maximize F1 inform the decision on what set of rules are most useful for real-world production system.

Figure 7:
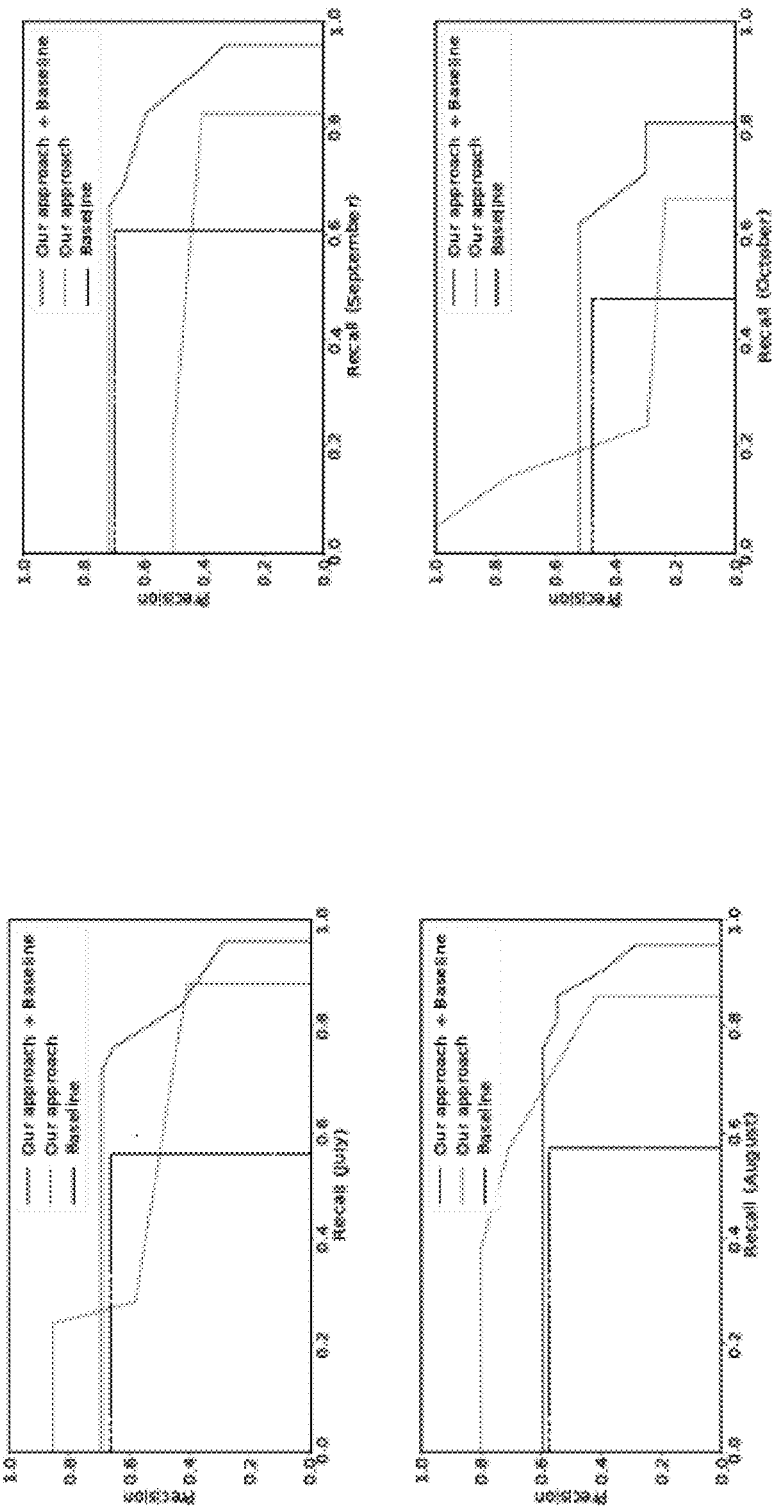
FIG. 7 is a set of graphs illustrating the precision-recall curve discussed herein.

Performance comparison: FIG. 7 shows the precision-recall curve for each of the testing months. By itself, the present approach performs comparable to the baseline in terms of F1—specifically providing higher precision in the case of lower recall. It should be noted that when the approach is combined with the baseline, the results improve further. The combined approach can significantly outperform the baseline in terms of both precision and recall, yielding a recall increase of at least 14% while maintaining precision. Furthermore, the baseline does not allow for a tradeoff between precision and recall while the present approach produces warnings with probability values, enabling not only better tradeoff between performance metrics, but also a metric approximating the importance of each warning, and allowing the human analyst to prioritize investigation.

Figure 8:
FIG. 8 is an image of an exemplary word cloud.

Transparent predictions: This approach may support transparent predictions i.e., the user knows why certain warnings is generated. The user may trace back to the rule corresponding to a warning, and view its precondition. Table 6 shows a few examples of preconditions of rules that generated warnings preceding attack incidents. The user can further pinpoint the collection of hacker discussions that are responsible for the warning. For example, FIG. 8 shows an exemplary word cloud generated from a collection of posts resulting in a warning submitted on August 23th. The warning predicts an event on August 25th, i.e., $\Delta t$ of 2. An event of malicious email is then observed by the Data Provider on August 26th.

TABLE 6

Examples of preconditions of rules that would have generated warnings preceding attack incidents

| Precondition | Probability | σ | Warning date | Lead time (days) |
|---|---|---|---|---|
| spike(Credit card) ∧ spike(Gmail) | 0.88 | 0.07 | Aug. 26 | 1 |
| spike(Email) ∧ spike(Security hacker) | 0.86 | 0.08 | Aug. 16 | 1 |
| spike(Google Play) | 0.92 | 0.04 | Aug. 13 | 2 |

Setup

Training/testing splits. The performance of the approach taken by this embodiment has been tested on each month starting from July-October, 2018. To produce the APT-logic program, an APT-EXTRACT algorithm may be used on the ground truth data and on the abnormal hacker activities observed in the 6-month-period preceding the testing month. Then, for each day in the testing month, this approach may generate warnings by matching the abnormal activities observed on that day with preconditions of rules in the APT-logic program. If a match exists, a warning may be generated for the day corresponding with the $\Delta t$ of the triggered rule.

Time-series forecasting baseline: The IARPA used may perform a baseline model that reads a training data of the Data Providers ground truth events and may model weekly time seasonality using a simple, constant base-rate model that calculates the average frequency of events from the training data. Using this approach, the model may be fitted to ground truth data from all the months prior to the testing month and the model may be used to generate warnings for the testing month.

Pairing ground truth events with warnings: To receive a score, each warning may be paired up with a single ground truth event occurring within the same day, or one day after the attack prediction date, i.e., a 1-to-1 relationships. To do so, the Hungarian assignment algorithm may be used to solve the warning-to-ground truth assignment problem, with the objective of maximizing warning-to-attack lead time. The results of the Hungarian algorithm may then be used to evaluate the performance of the proposed approach as well as the baseline model.

Evaluation

Evaluation metrics: Standard evaluation metrics such as precision, recall, and F1 may be used. Precision is the fraction of warnings that match ground truth events, recall is the fraction of ground truth events that are matched, and F1 is the harmonic mean of precision and recall. Using these metrics, a performance comparison may be presented between the proposed approach and the baseline model. Additionally, it may be shown that a fused model can benefit from the temporal correlations and statistical characteristics captured by the proposed approach and the baseline model, respectively.

Fusion: A simple combining strategy may be used to test the performance of a fused model. The warnings from the two approaches, i.e., the approach of this embodiment and the baseline, may be combined. The warnings may be grouped by their generation date and prediction data. Then, half of the warnings may be removed from each group. The goal is to leverage the power of the individual approaches while limiting their intersection, i.e., removing half of the duplicate warnings.

Grid search: The condition on what rules are to be considered in the APT-logic program, i.e., rules whose probability is higher than the prior probability of the postcondition, may not guarantee the highest performance. Therefore, the classical Grid search method may be used to find optimal minimum thresholds on rule probability and support. The parameter values that maximize F1 may inform the decision on what set of rules are most useful for real-world production system.

TABLE 7

Examples of preconditions of rules that would have generated warnings preceding attack incidents.

| Precondition | Probability | Warning date | Lead time (days) |
|---|---|---|---|
| spike(Credit card) ∧ spike(Gmail) | 0.88 | Aug. 26 | 1 |
| spike(Email) ∧ spike(Security hacker) | 0.86 | Aug. 16 | 1 |
| spike(Google Play) | 0.92 | Aug. 13 | 2 |

Result

Performance comparison. FIG. 7 shows the precision-recall curve for each of the testing months. Overall, the warning generation approach of this embodiment performs comparably to the baseline approach. It should be noted that the baseline may not allow for a tradeoff between precision and recall while this approach may produce warnings with probability values, enabling not only better tradeoff between performance metrics, but also a metric approximating the importance of each warning. That should allow the human analyst to prioritize investigation. In addition, the figure demonstrates high potential for the fused approach as it clearly outperforms the individual predictors.

Transparent predictions: The approach of this embodiment supports transparent predictions i.e., the user knows why certain warnings are generated. The user can trace back to the rule corresponding to a warning, and view its precondition. Table 1 shows a few examples of preconditions of rules that generated warnings preceding attack incidents. The user can further pinpoint the collection of hacker discussions that are responsible for the warning. For example, FIG. 8 shows the word cloud generated from the collection of posts resulting in warnings submitted on August 23th. The warning predicts an event on August 25th, i.e., Δt of 2. An event of malicious email is then observed by the Data Provider on August 26th.

In some embodiments, rule-based learning, i.e., implementation of the Learning Module 106 may involve Knowledge Representation and Reasoning (KRR). KRR supports formally explainable reasoning, which is a desirable feature for many applications, including predicting cybersecurity incidents. Yet much of KRR is too rigid for real-world applications. On the other hand, it is hard to incorporate knowledge that is not statistically present in the training data (e.g., expert knowledge) to Machine Learning (ML) models, and for some models (e.g., neural networks and SVMs), it is hard to explain the output of ML.

In some embodiments, concept drift may be considered. Hacking tactics advance rapidly corresponding to advances in cybersecurity, i.e., new vulnerabilities are discovered, new exploits are integrated with malware kits, attack signatures are identified, etc. Likewise, the attacks observed in the wild and the activities of hackers in the hacker community websites such as social media are always evolving. This change in the underlying data distribution for both the hacker discussions and the predicted events is known as "concept drift". To account for potential impact of concept drift, in each month, in some embodiments a learner is run on data from the previous 6 months, and the resulting rules may be used to predict events in the examined month.

In some embodiments, warning generation by the prediction module 108 may be executed daily by first acquiring all CVEs mentioned in the last 24 hours within the D2web streaming data. The CPE groups/nation-state actors for these mentioned CVEs may then be obtained. Next, based on the APT-rules—the prediction module 108 may try to match the CPE/nation-state actor mappings to a particular rule. If a match exists, the prediction module 108 may predict if and when an attack exploiting the vulnerabilities will occur by generating a warning. The warning fields may be populated using the information contained in the rule, such as the probability, event type, and target organization.

In some embodiments, some of the non-functional requirements related to the generated warnings (i.e., timely, actionable, accurate, and transparent), may be maintained by the system 100 over time. Further, due to various factors relating to both intelligence data (i.e. the ephemeral nature of D2web sites) and enterprise data (i.e. data from a Security Information Event Manager or SIEM, which can be subject to schema differences due to policy changes over time), further requirements are examined for this approach.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of predicting likelihood of exploitation for cyber threats before they occur, the method, comprising:
providing a processor in communication with a tangible storage medium;
storing instructions that are executed by the processor to perform operations comprising:
accessing a first dataset defining communications from forums and marketplaces associated with a hacker community;
deriving a plurality of temporal rules by correlating a plurality of indicators generated from the first dataset and ground truth information associated with known cyberattacks by:
filtering out data that is not related to cybersecurity;
retaining data that is related to cybersecurity;
recognizing entities from the context of postings and assigning a confidence score;
using the confidence score and potential impact of concept drift to filter for relevant entities; and
using machine learning to derive the temporal rules;
the plurality of indicators including mappings between a vulnerability and a platform known to be susceptible to the vulnerability; and
predicting a cyber threat, including:
identifying an indicator of the plurality of indicators from a second dataset, the second dataset defining additional communications from the hacker community and the indicator being a precondition to a corresponding rule of the plurality of temporal rules, and applying information associated with the indicator to the corresponding rule of the plurality of temporal rules to output at least one prediction of a future attack associated with the cyber threat.

2. The method of claim 1, further comprising generating the plurality of rules by deriving a set of probability boundaries of future actions using an annotated probabilistic temporal logic rules framework and narrowing the set of probability boundaries.

3. The method of claim 2, wherein one of the plurality of rules defines a probability value for the attack associated with the cyber threat occurring within a predetermined time interval of a condition being true.

4. The method of claim 3, wherein a point frequency function of the annotated probabilistic temporal logic rules framework is applied to output a frequency value for the attack following identification of the indicator from the second dataset in an exact time interval and defines a predetermined precise temporal relationship between the attack and the indicator.

5. The method of claim 4, wherein the frequency value for the attack following the indicator in an exact time interval is calculated using a probability interval.

6. The method of claim 2, wherein an existential frequency function of the annotated probabilistic temporal logic rules framework is applied to output a frequency value for the attack following identification of the indicator within a predetermined number of time points and defines a specified temporal relationship between the attack and the indicator.

7. The method of claim 6, wherein the frequency value for the attack following the indicator within a predetermined number of time points is calculated using a probability interval.

8. The method of claim 1, wherein a plurality of rule-learning approaches are applied to learn a set of temporal correlations between the first dataset and the known cyber-attacks.

* * * * *